United States Patent
Do et al.

(10) Patent No.: US 7,247,261 B2
(45) Date of Patent: *Jul. 24, 2007

(54) NONLINEAR OPTICAL MATERIAL WITH NANO-SIZED DENDRIMER STRUCTURE

(75) Inventors: Jung Yun Do, Daejon (KR); Seung Koo Park, Daejon (KR); Jung Jin Ju, Daejon (KR); Suntak Park, Daejon (KR); Min-su Kim, Daejon (KR); Myung Hyun Lee, Daejon (KR)

(73) Assignee: Electronics and Telecommunications Research Institute (KR)

( * ) Notice: Subject to any disclaimer, the term of this patent is extended or adjusted under 35 U.S.C. 154(b) by 80 days.

This patent is subject to a terminal disclaimer.

(21) Appl. No.: 10/699,138

(22) Filed: Oct. 30, 2003

(65) Prior Publication Data

US 2004/0232393 A1  Nov. 25, 2004

(30) Foreign Application Priority Data

May 12, 2003  (KR) ...................... 10-2003-0029961
Jun. 25, 2003  (KR) ...................... 10-2003-0041480

(51) Int. Cl.
G02B 5/23 (2006.01)
C08F 283/01 (2006.01)
C08F 283/08 (2006.01)
F21V 9/00 (2006.01)

(52) U.S. Cl. ...................... 252/586; 252/582; 525/534; 528/86; 528/354; 528/355

(58) Field of Classification Search ................ 252/582, 252/586
See application file for complete search history.

(56) References Cited

U.S. PATENT DOCUMENTS 4,994,209 A  2/1991  Okazaki
5,587,441 A * 12/1996  Frechet et al. .............. 526/238
5,587,446 A * 12/1996  Frechet et al. .............. 526/333
5,723,511 A *  3/1998  Kazmaier et al. ............ 522/35
6,252,025 B1 *  6/2001  Wang et al. ............. 526/292.9
6,784,287 B2 *  8/2004  Do et al. .................... 534/797
2002/0155523 A1* 10/2002  Sparks ....................... 435/68.1

FOREIGN PATENT DOCUMENTS

KR  1001519060000  6/1998

OTHER PUBLICATIONS

Tomalia et al. "Dendridic macromolecules" in AccessScience@McGraw-Hill, http://www.accessscience.com, DOI 10.1036/1097-8542. YB980185, Apr. 10, 2000.*
Nonlinear optical materials containing organic chromophores of dendrimer structures: Synthesis and Optical properties, (Photonics Conference 2002, Oct. 30-Nov. 1, 2002).
Chem. Mater. 1995, vol. 7, No. 6, pp. 1060-1081.
Ind. Eng. Chem. Res. 1999, vol. 38, No. 1, pp. 8-33.

* cited by examiner

Primary Examiner—Randy Gulakowski
Assistant Examiner—Timothy J. Kugel
(74) Attorney, Agent, or Firm—Blakely Sokoloff Taylor & Zafman

(57) ABSTRACT

The present invention relates to a non-linear optical material having a dendrimer structure; and, more particularly, to a non-linear optical material having organic chromophores at the ends and formed based on ester linkages and/or ether linkages. Since the non-linear optical material of the present invention is formed based on ester linkages and/or ether linkages, it is very stable. Also, because it is a dendrimer structure, it has the properties of a polymer while having a strong connection ability at the ends, and this makes the non-linear optical material easily adopt organic chromophores easily. As it is stable thermally and optically, it can be applied to optical communication usefully.

5 Claims, 2 Drawing Sheets

NONLINEAR OPTICAL MATERIAL WITH NANO-SIZED DENDRIMER STRUCTURE

FIELD OF THE INVENTION

The present invention relates to a non-linear optical material having a dendrimer structure; and, more particularly, to a non-linear optical material having organic chromophores at the ends and formed based on ester linkages and/or ether linkages.

DESCRIPTION OF RELATED ART

A dendrimer is a macromolecule having a branched shape. The macromolecule is symmetrical and well-ordered in two-dimensional or three-dimensional. There are two types of dendrimers: Cone types and globular types. Dendrimers are similar to polymers in that they are giant molecules having a very large molecular weight. However, they are different from general linear polymers in that they are symmetrical circularly and that they are unimolecules with no distribution of molecular weight. In short, dendrimers have the properties of both monomers and polymers. This is very advantageous to their use.

A precursor of a dendrimer compound was first synthesized by E. Buhleier, W. Wehner, F. Vogtle in 1978 (Synthesis, 155, 1978). A dendrimer synthesized by D. A. Tomalia in early 1980 has drawn great attention with its unique symmetrical structure and unique shape and its dendrimer structure (Polym. J. 1985 17, p. 117-132 and Macromolecules 1986 20, 1164).

Also, dendrimers can be formed in a convergent method or a divergent method according to how they are synthesized, which is disclosed in Aldrichim. Acta 1993 26, 90; Am. Chem. Soc. 1990 112, 7638; and J. Am. Chem. Soc. 1992 114, 1018. Since the central part of a dendrimer is completely or almost isolated from the outside, it is possible to protect diverse metal ions or specific functional groups. Also, the wide three-dimensional surfaces of the dendrimer allow the dendrimer to adopt functional groups chemically and be applied for various purposes.

Since the structures of dendrimers are similar to bioactive materials, such as globular proteins, enzymes and deoxyribonucleic acid (DNA), they have attracted the interest of many researchers. Due to these properties of dendrimers, many researchers have studied the dendrimers in the aspects of guest-host chemical reactions, drug delivery systems, catalysts and surfactants. Recently, dendrimers having a porphyrin ring including zinc at the center and having an ether amide structure have been studied to utilize the property of electron-transfer in a protein (Angew. Chem. Int. Ed. Engl. 1994 33, 1739).

Research on guest-host reactions, involves iron-based dendrimers G. Am. Chem. Soc. 1997 119, 2588) or metallocene-containing dendrimers (Chem. Rev. 1999.99, 1689). Also, many researches are conducted to use the dendrimers as an organic light emitting diode and to enhance the stability, durability and light emitting efficiency (J. Am. Chem. Soc. 1996 118, 5326; and J. Am. Chem. Soc. 1994 116, 4537).

In addition, researchers are studying dendrimers having an optical activity. Most of them pay attention to the unique properties of dendrimers originating from their structural features (Macromolecules 1990 23, 912; and Adv. Mater. 1996 8, 494).

Among dendrimers having nonlinear optical phenomena, a material having organic molecules dispersed in a polymer medium (Chem. Mater. 1999, 11, 1966) deteriorates thermal stability due to fluidity of the molecules in the polymer medium. Moreover, coagulation of organic monomers causes optical loss. All this makes the material more restricted in application.

On the other hand, a material having the advantages of polymers' processing properties by polymerizing nonlinear organic molecules is desirable. A nonlinear polymer becomes a main chain or side chain according to how monomers are combined. Research is being conducted to develop a giant molecular polymer having a regularly arranged dendrimer structure and chemically complete linkage, which is different from the conventional linear polymers, and to apply the giant molecular polymer to various fields (U.S. Pat. No. 5,659,010; U.S. Pat. No. 5,496,899; U.S. Pat. No. 6,001,958; J. Am. Chem. Soc. 2000, 122, 3174; and Thin Solid Films 1998, 331, 248).

Main chain polymers are not easily synthesized with nonlinear optical chromophores, and the efficiency of the three-dimensional arrangement of the formed polymer is quite low in a poling process. Side chain polymers are generally formed by attaching the monomolecular chromophores on the main polymer as its branches. This method is difficult in that the main polymer should react with the chromophores directly, but since the chromophores exist as branches of the main chain, their structures are relatively favorable in the respect of the arrangement of the chromophores.

The dendrimers are advantageous in that they are symmetrical in three-dimensional and they can have different material properties according to functional groups adopted at the end. Moreover, chromophores molecules in the dendrimer can be separated from each other completely if the structure of the dendrimer molecule is well-designed. If more than a predetermined content level of chromophores are adopted in the polymers, the chromophores become aggregated due to the static electricity between the chromophores. Thus, the optical nonlinearity is degraded and optical loss occurs due to the aggregation. Recently, researchers have been trying to find solutions to theses problems in the use of dendrimers (Appl. Phys. Lett. 2000, 77(24), 3881).

SUMMARY OF THE INVENTION

It is, therefore, an object of the present invention to provide an optical material having a dendrimer structure with excellent optical properties, which can prevent decrease in nonlinearity or optical loss, which is caused when chromophores are included.

The inventors have completed the present invention by taking a conception that a nonlinear optical material having excellent optical properties can be formed by combining organic chromophores with a polymer having a dendrimer structure.

The present invention provides a nonlinear optical material having a dendrimer structure which includes organic chromophores at ends, the dendrimer structure being formed based on ester linkages and/or ether linkages.

Since the material used in the present invention has a dendrimer structure based on ester linkages and/or ether linkages, it is very stable and phenolic OH groups are distributed evenly at a high density at ends of a precursor of the polymer. The polymers having a dendrimer structure that can be combined with chromophores may have structures of first to sixth generations upon the repeat number. As described above, the polymers have a dendrimer structure with organic chromophores at the end. Table 1 shows examples of the organic chromophores that can be used.
TABLE 1
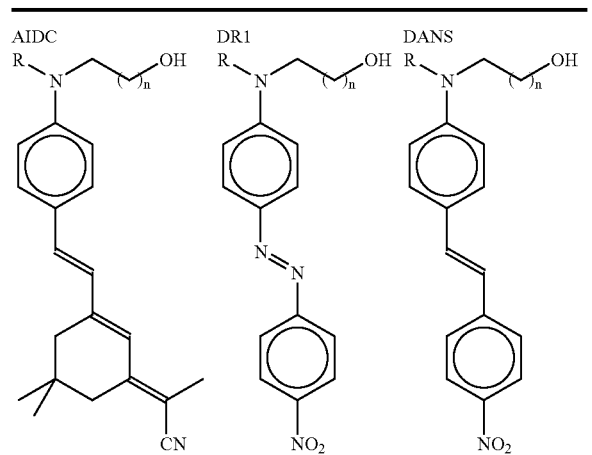
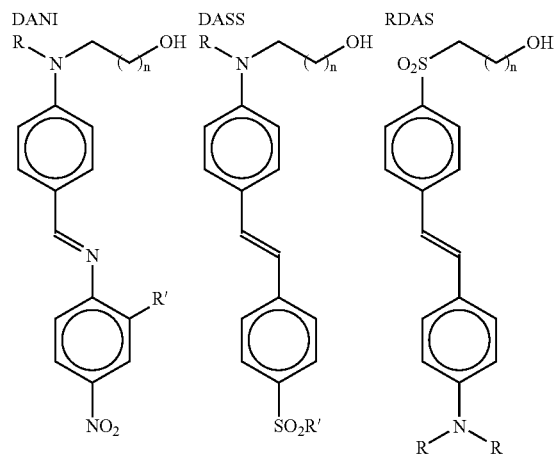
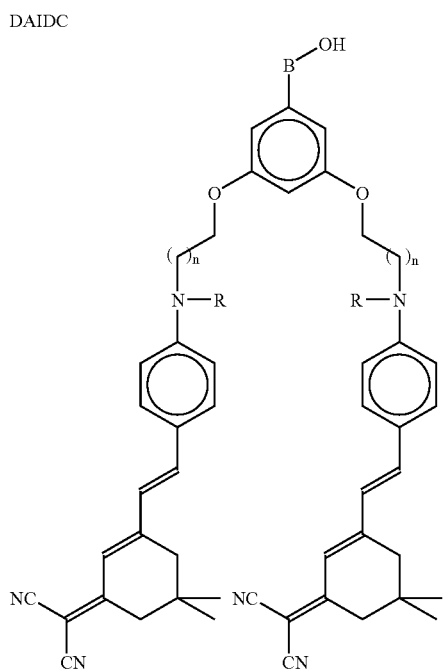
TABLE 1-continued
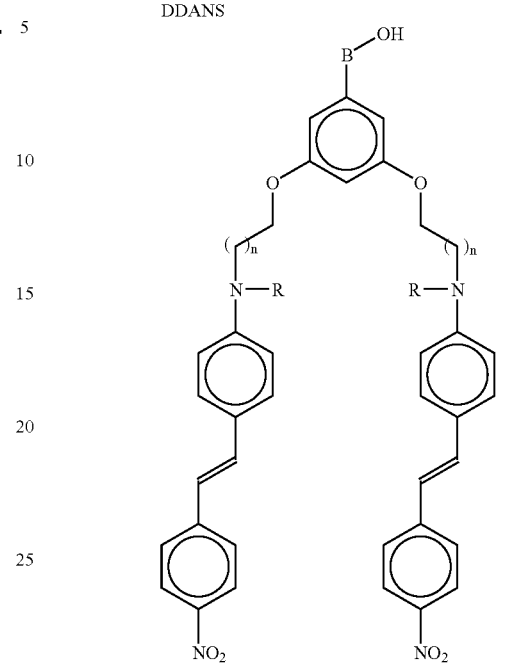
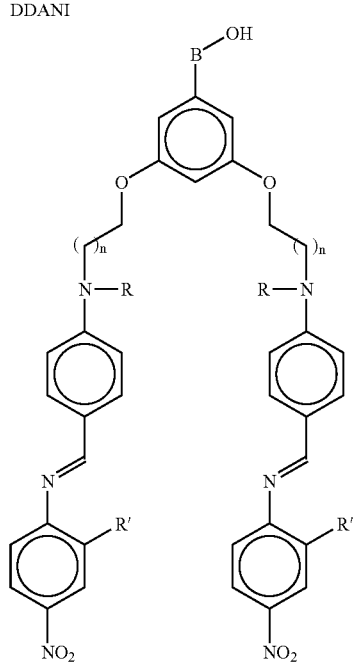

TABLE 1-continued

DDR1

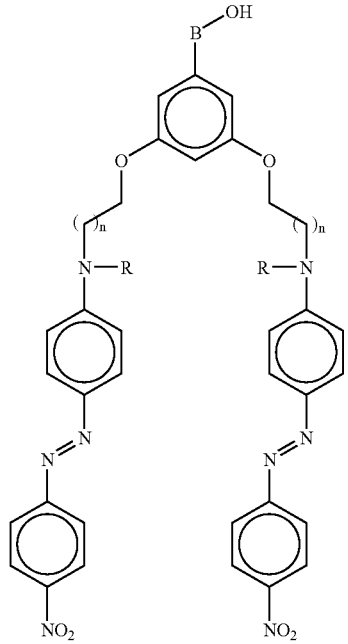

DDASS

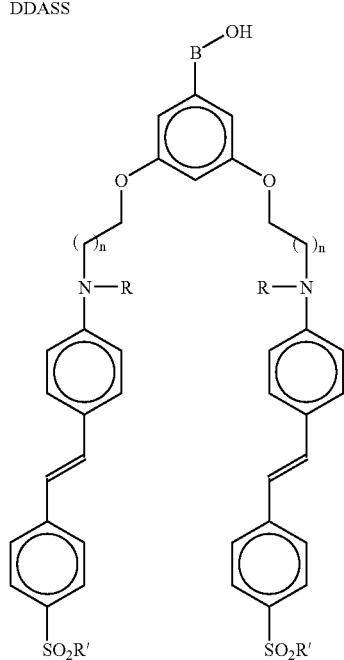

TABLE 1-continued

DRDAS

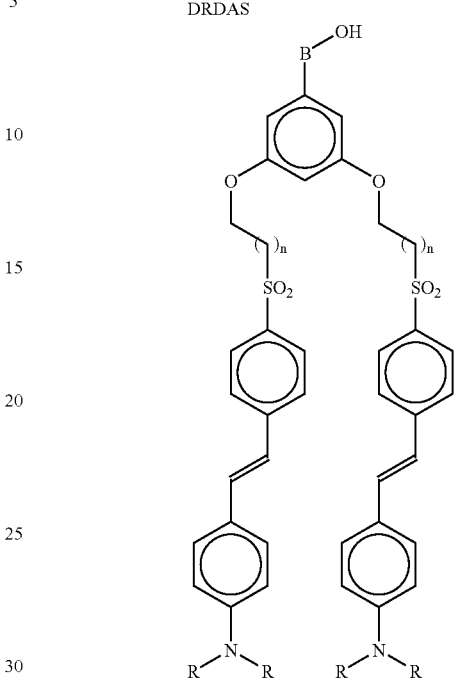

In Table 1, R and R' are H, Ph, or an alkyl group including 1 to 6 carbon atoms; n is an integer in a range of 1 to 11; and B denotes an alkyl group (including 1 to 6 carbon atoms) or a COOA (A being an alkyl group including 1 to 6 carbon atoms).

The non-linear optical material can be synthesized by linking the organic chromophores shown in Table 1 to the ends of the polymer having a dendrimer structure, i.e., dendritic polymer.

To part of the ends of the dendritic polymer, a non-chromophore may be linked instead of organic chromophores, or both organic chromophores and non-chromophores may co-exist at a diverse ratio. Desirably, the non-chromophores used here are aliphatic or aromatic hydrocarbon compounds having 1 to 16 carbon atoms and combined with chemical functional groups for thermal and/or optical chemical reaction.

BRIEF DESCRIPTION OF THE DRAWINGS

The above and other objects and features of the present invention will become apparent from the following description of the preferred examples given in conjunction with the accompanying drawings, in which.

DETAILED DESCRIPTION OF THE INVENTION

Figure 1:
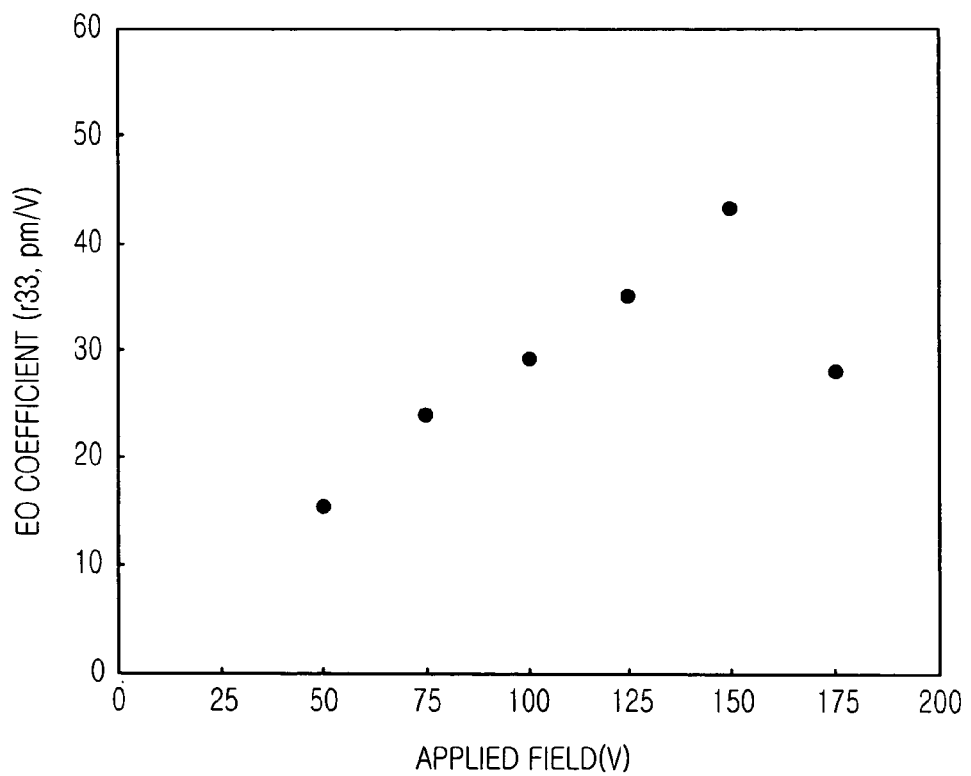
FIG. 1 is a graph showing electro-optical (EO) coefficients based on the intensity of an electric field of an optical material having a dendrimer structure, i.e., a dendrimer, in accordance with an example of the present invention.

Other objects and aspects of the invention will become apparent from the following description of the examples with reference to the accompanying drawings, which is set forth hereinafter.

In this part of the present specification, a process for preparing some representative compounds that could be precursors for dendrimers will be described.

Preparation of Precursors for Optical Dendrimers Based on Ester Linkage

A chemical compound (1) is obtained by protecting a benzoic group of a 3,5-dehydroxy benzoic acid with a trichloroethanol, and a chemical compound (2) is obtained by protecting an OH group of a phenolic group with a benzyl group. Then, the chemical compounds (1) and (2) are combined by performing esterification using a coupling reagent in the presence of acids of catalytic amount. They can also be combined by a Mitsunobu reaction that uses triphenylphosphine and diethyl azodicarboxylate (DEAD), but this method may cause a problem in separation and refinement due to a possible side reaction of an acid anhydride. Protected groups of the obtained compound (3) are removed by reaction with zinc. This process is illustrated in Reaction Formula 1.

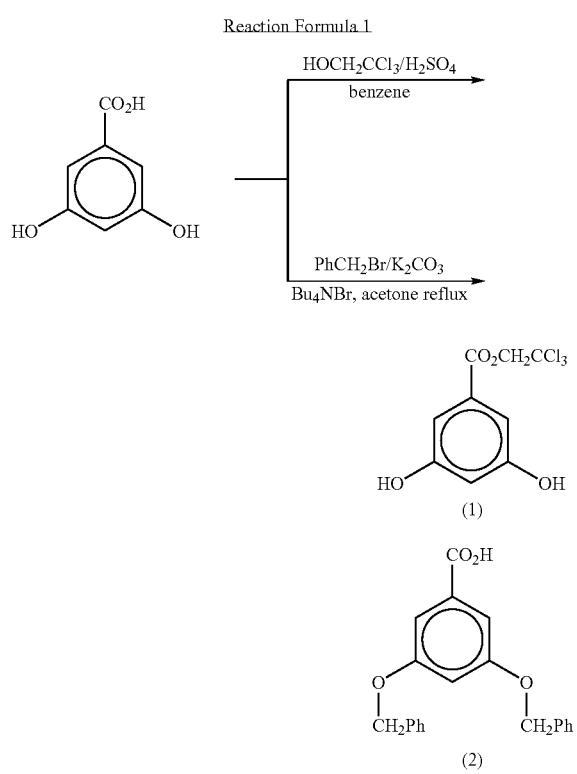

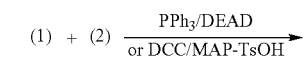

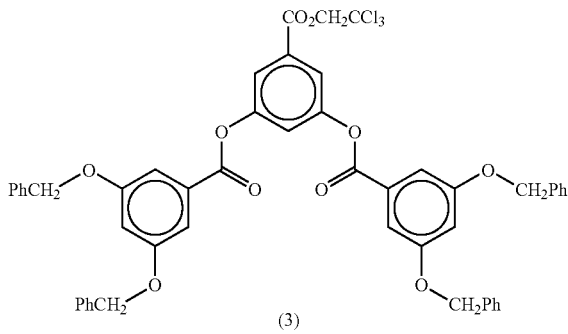

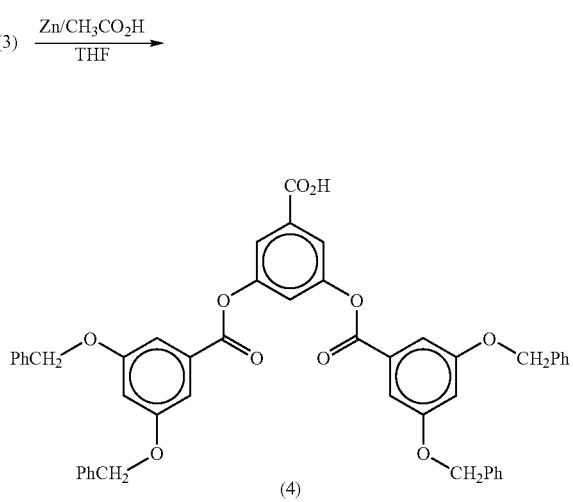

In case that a core structure for forming a dendrimer is plane, a coupling reaction is performed as shown in Reaction formula 2 by using 1,3,5-trihydroxy benzene, and debenzylation reaction is performed by adding hydrogen in the presence of palladium charcoal to form a compound (6). The compound (6) can be a precursor for an optical dendrimer structure.

Similarly, for the core of three-dimensional an SP3 structure, a compound (8) can be obtained as an optical dendrimer precursor by using 1,1,1-trihydroxyphenylethane, which is shown in Reaction Formula 2 below.

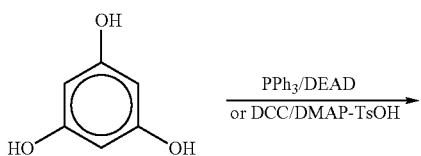

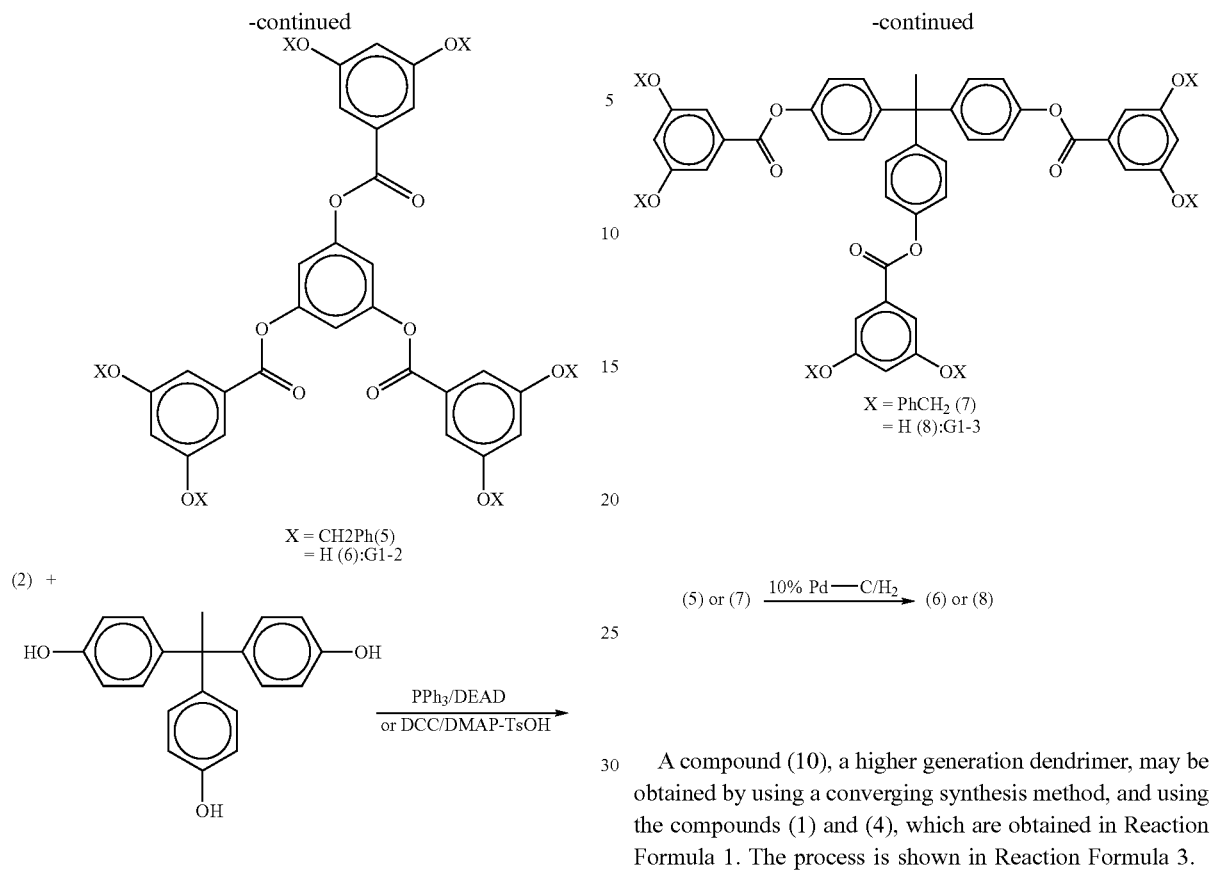
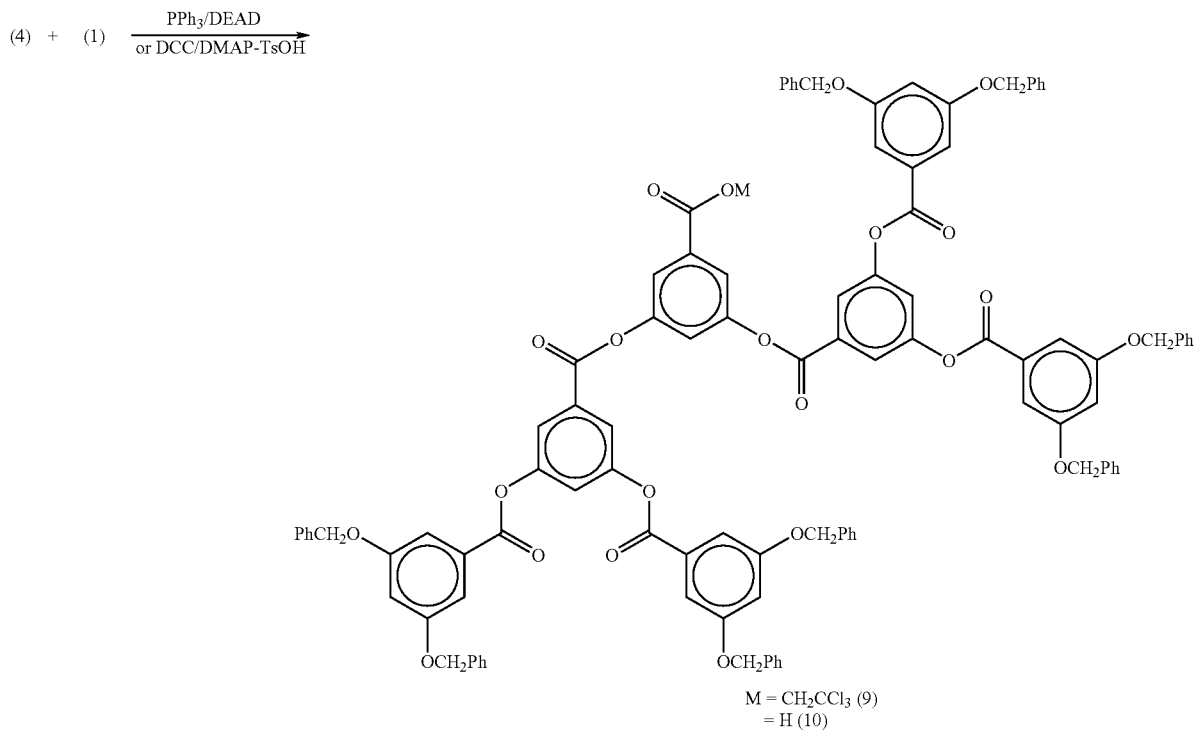
A compound (10), a higher generation dendrimer, may be obtained by using a converging synthesis method, and using the compounds (1) and (4), which are obtained in Reaction Formula 1. The process is shown in Reaction Formula 3.

From the obtained compound (10), a compound (12) and a compound (14), which are second-generation optical dendrimer precursors, can be prepared through a process similar to the coupling reaction of Reaction Formula 2. The process is shown in Reaction Formulas 4A and 4B.
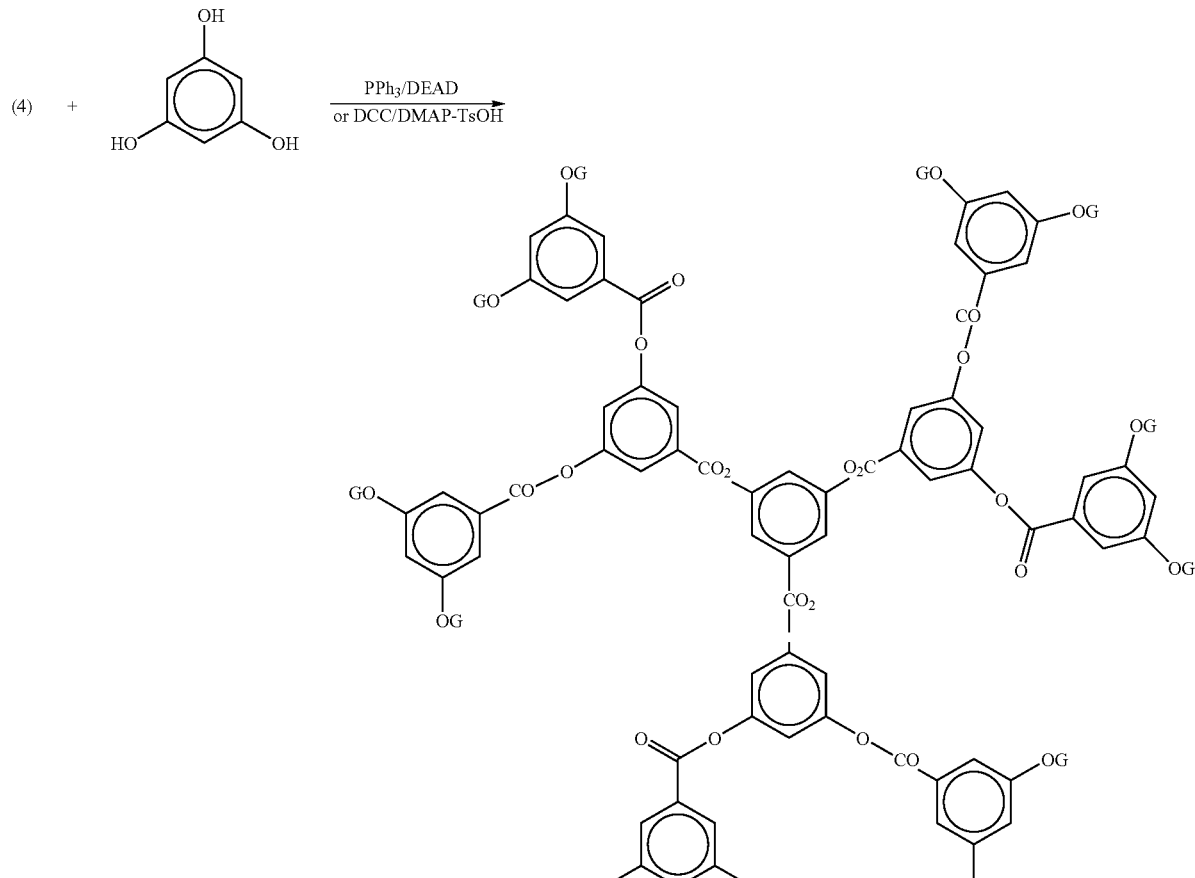
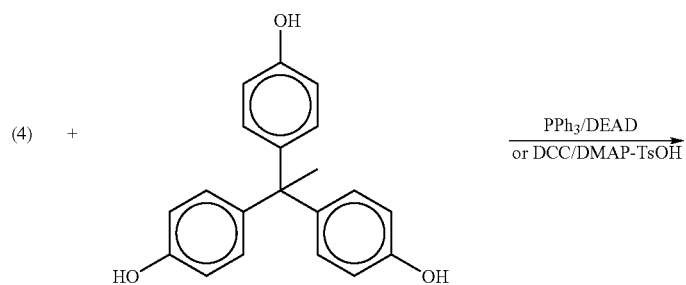

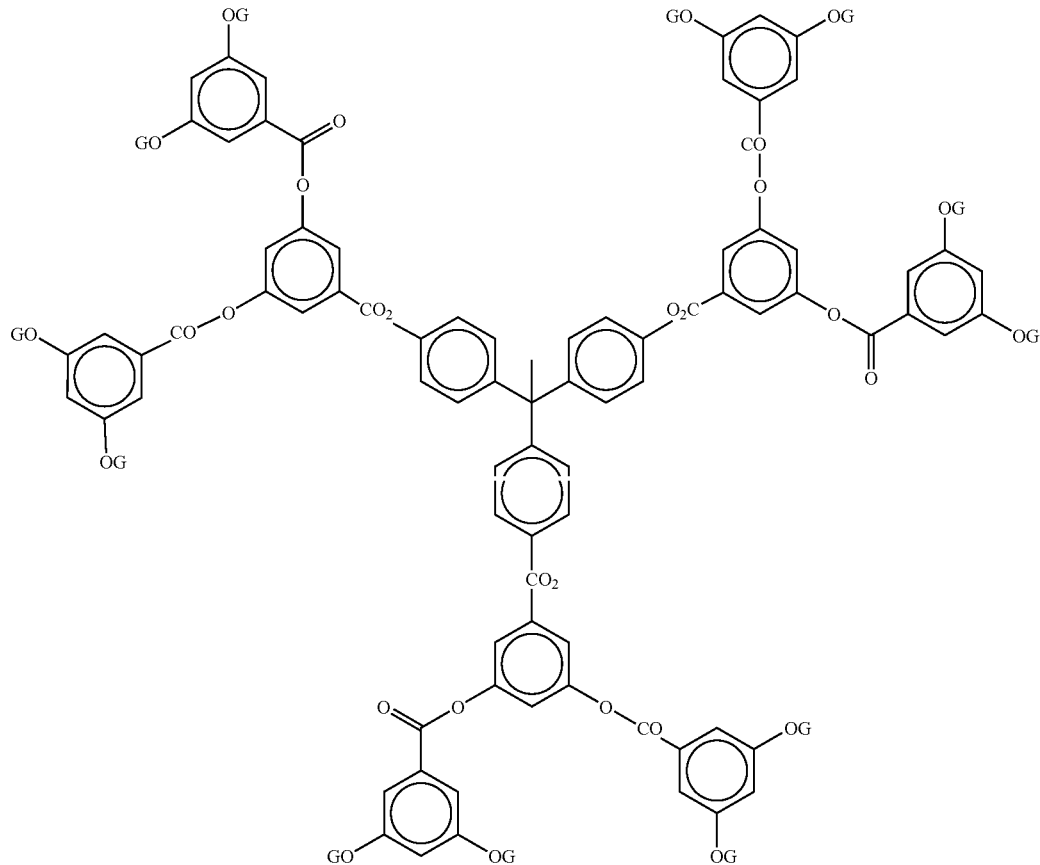
G = OCH₂Ph (13)
= H (14):G2-3
A compound (16) and a compound (18), i.e., third-generation dendrimer precursors, can be prepared in a similar process, which is shown in Reaction Formulas 5A and 5B.
Reaction Formula 5A
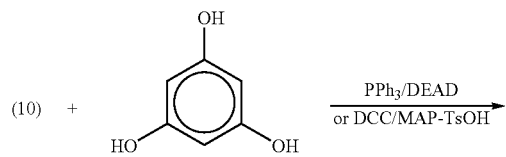

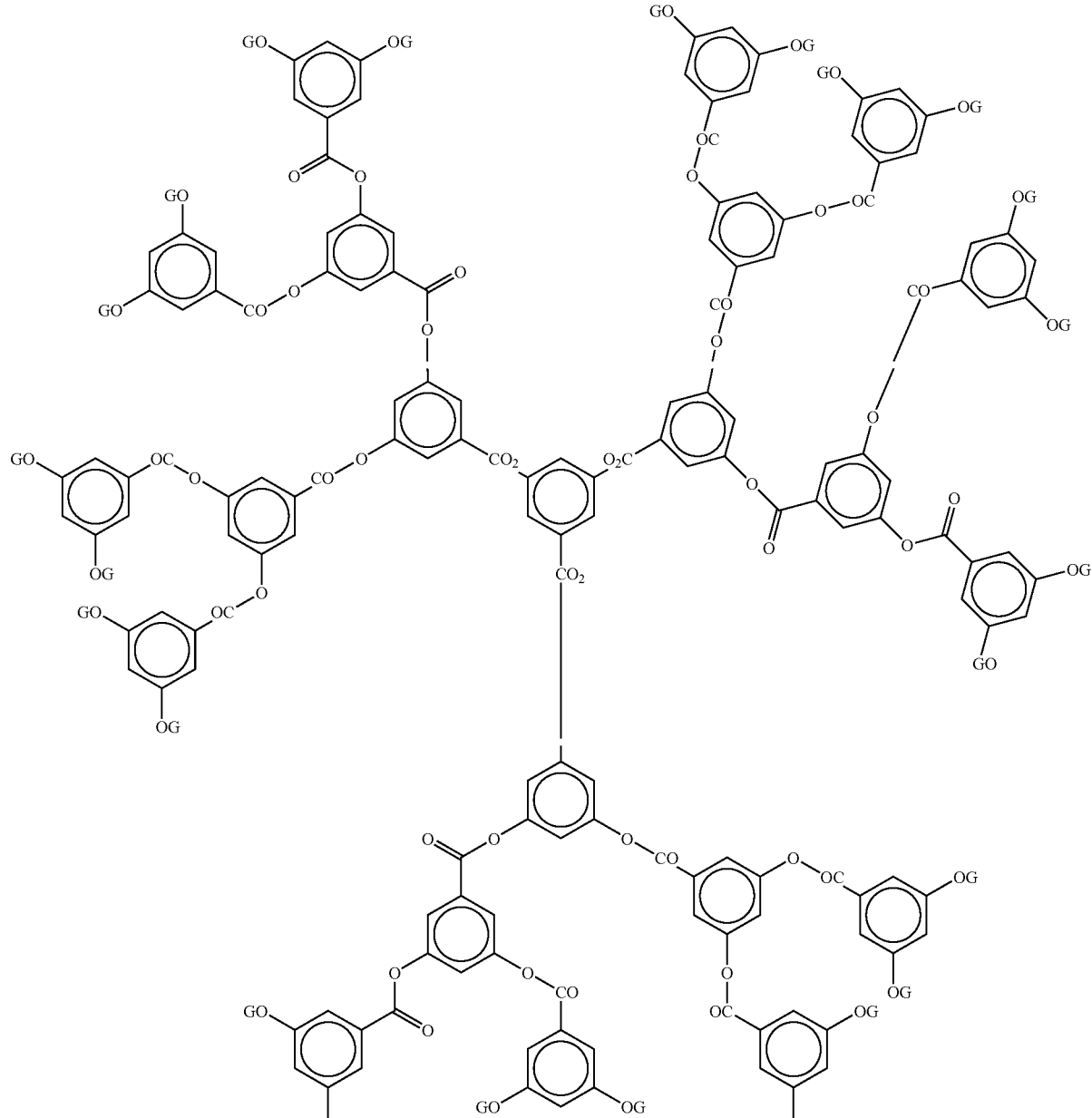
G = OCH₂Ph (15)
= H (16):G3-2
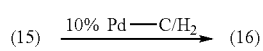
Reaction Formula 5B
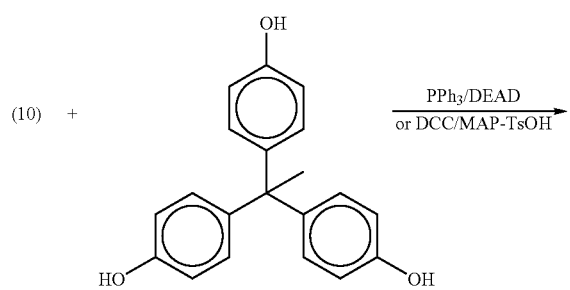

-continued
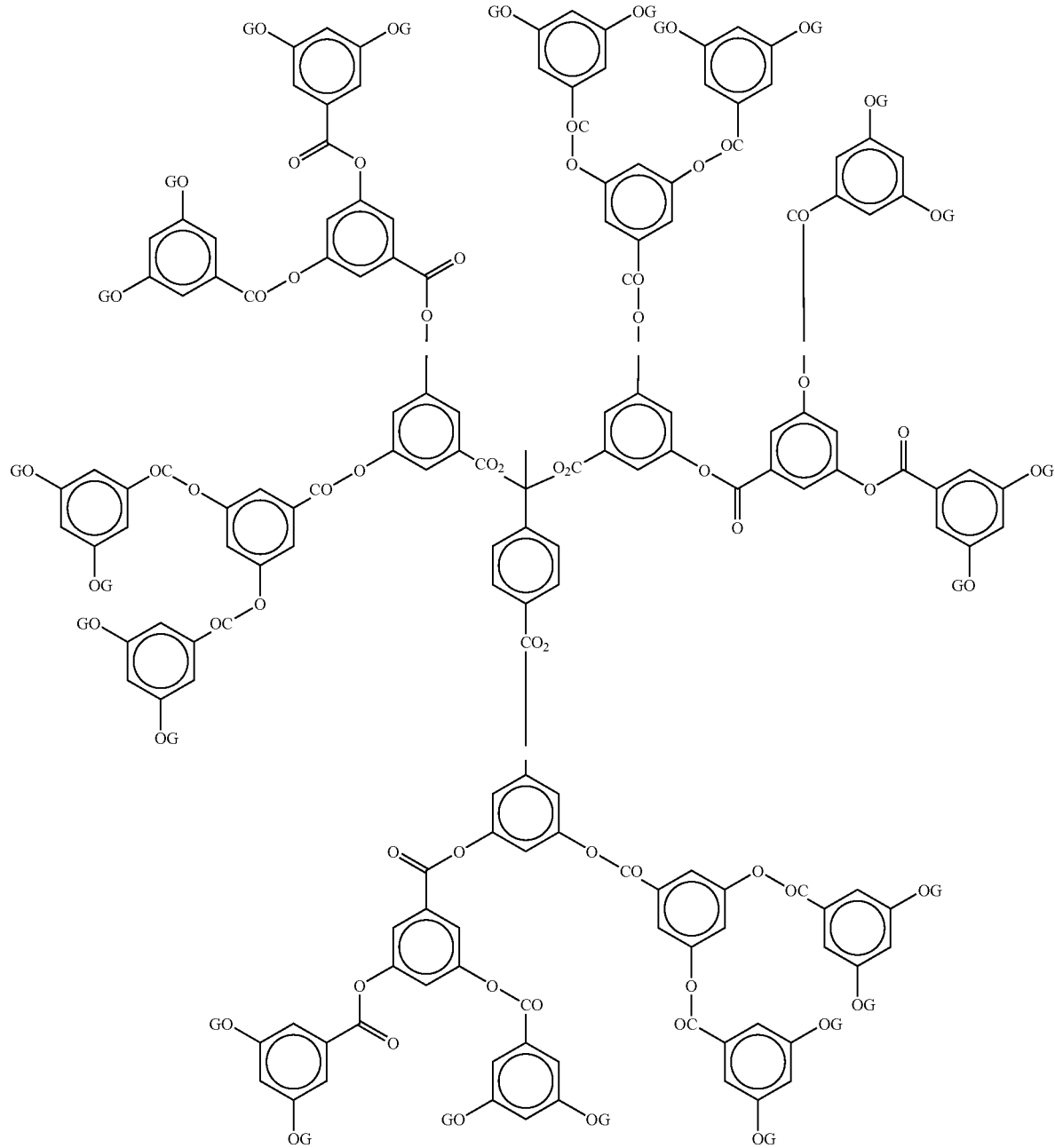
G = OCH₂Ph (17)
= H (18):G3-3
(17) →[10% Pd—C/H₂] (18)

These methods described above, i.e., methods for preparing a precursor based on ester linkage, can be applied to a synthesis of a dendrimer based on ether linkages, other than a dendrimer based on ester linkage.

Preparation of Precursors for Optical Dendrimers Based on Ether Linkages

Phenolic OH groups of 3,5-dihydroxybenzyl alcohol are protected by using benzyl groups to produce a compound (19).

A compound (21) is prepared by reacting the compound (19) and 1,3,5-trihydroxy benzene as shown in the Reaction Formula 6. The prepared compound (21) is used as a precursor for a core material of dendrimer having plane-structure.

Reaction Formula 6

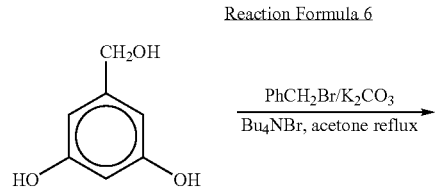

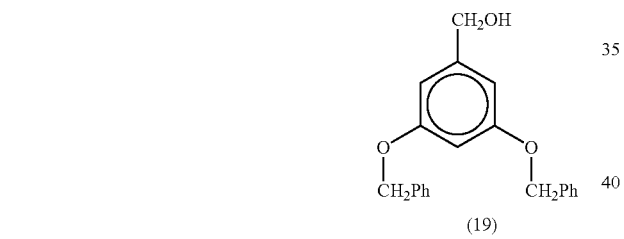

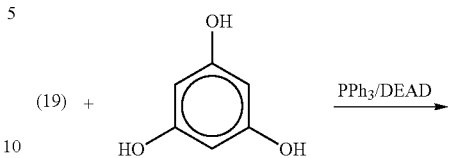

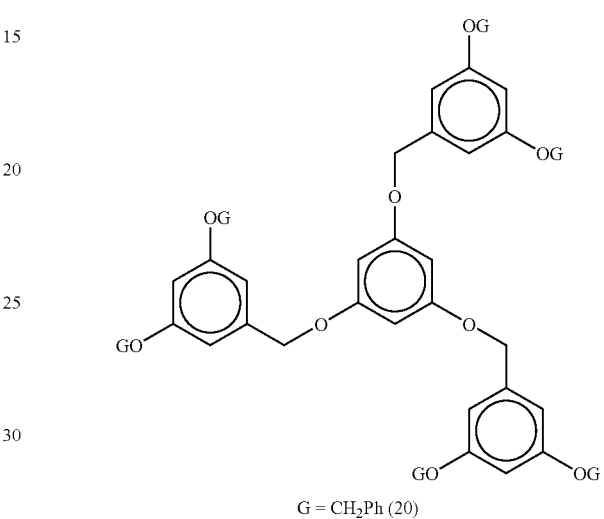

$G = CH_2Ph\ (20)$
$= H\ (21){:}G1\text{-}1$

(20) $\xrightarrow{10\%\ Pd\text{—}C,\ H_2}$ (21)

Similarly, a second-generation dendrimer structure, for example, a compound (23) can be prepared as shown in Reaction Formula 7 below.

Reaction Formula 7

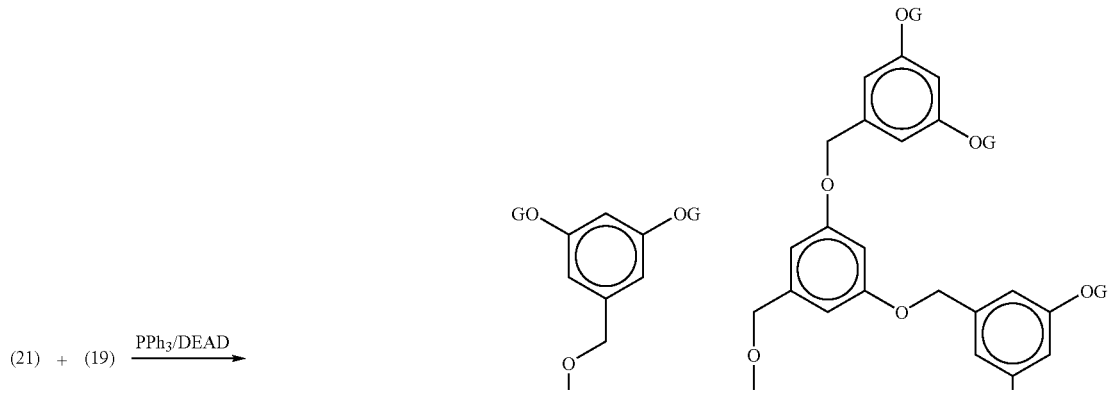

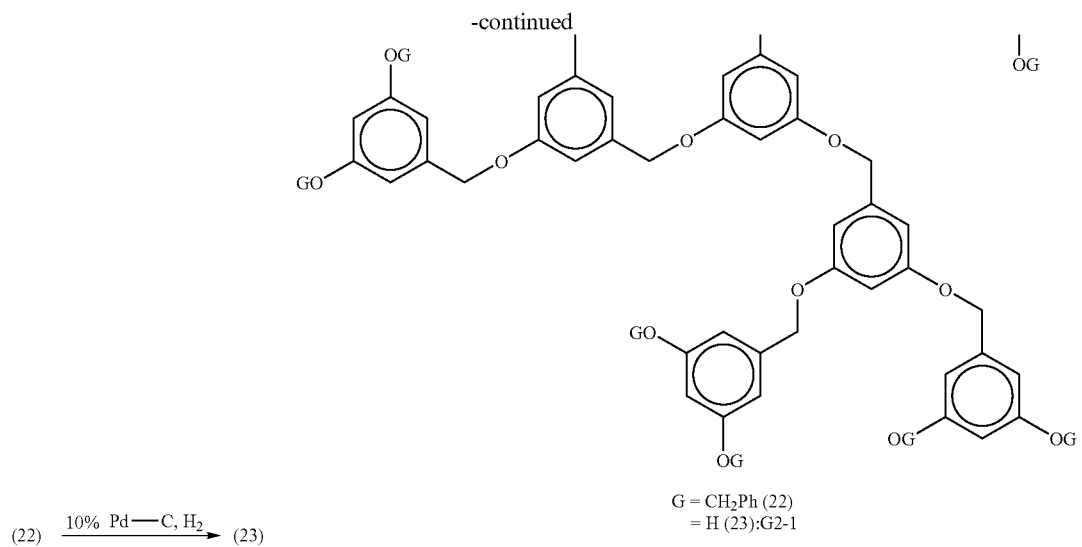
G = CH₂Ph (22)
= H (23):G2-1
(22) —10% Pd—C, H₂→ (23)
A compound (25) is prepared by reacting the compound (19) and 1,1,1-trihydroxyphenyl ethane, as shown in Reaction Formula 8A. The prepared compound (25) is used as a precursor for a core material of dendrimer having SP3-structure.
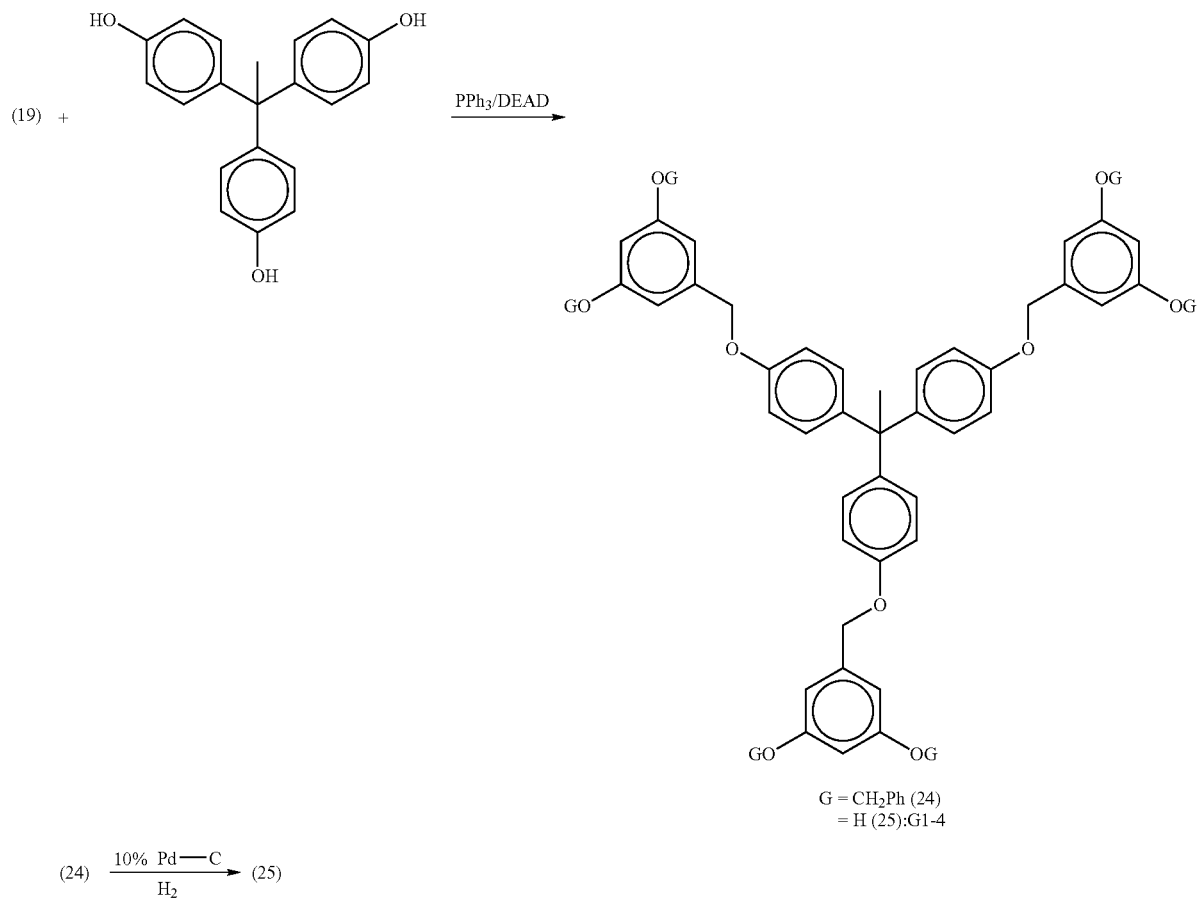
Reaction Formula 8A
G = CH₂Ph (24)
= H (25):G1-4
(24) —10% Pd—C / H₂→ (25)

Similarly, a compound (27), a second-generation dendrimer structure, can be prepared as shown in Reaction Formula 8B.
Reaction Formula 8B
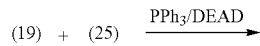
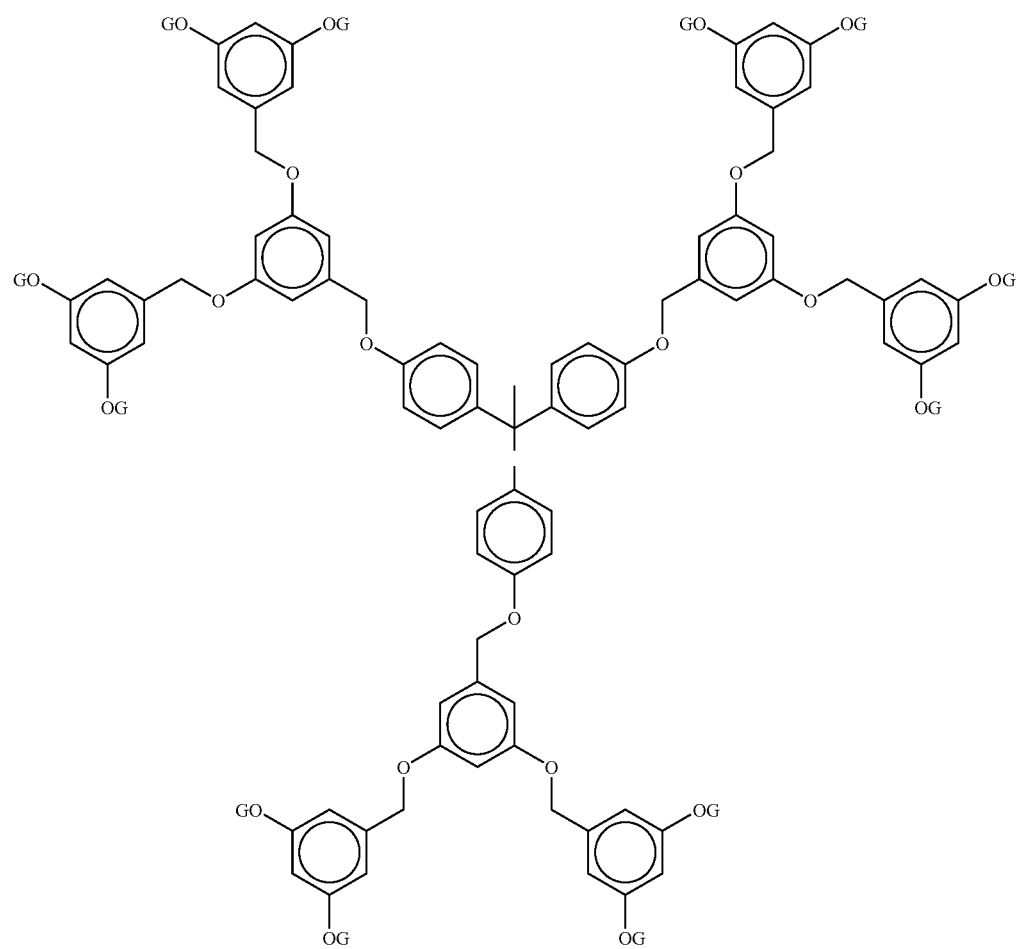
G = CH$_2$Ph (26)
= H (27):G2-4
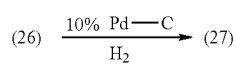

Through simple repetition of the above reactions, various materials of high-generation dendrimer structures based on ester and ether linkages can be prepared. Some of the compounds that can be prepared are shown in Formulas 28 through 31.
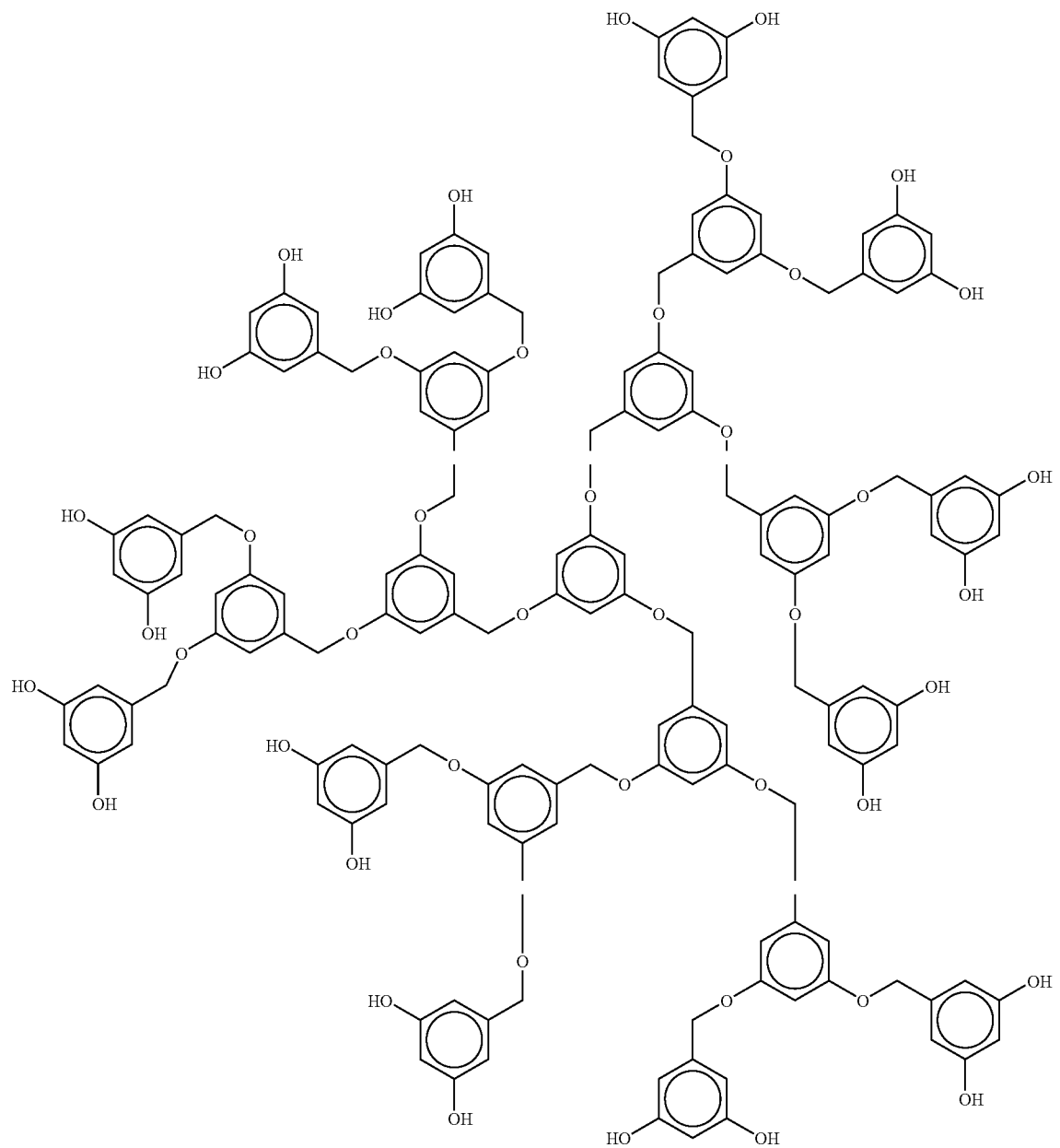
Formula 28
(28):G3-1

Formula 29
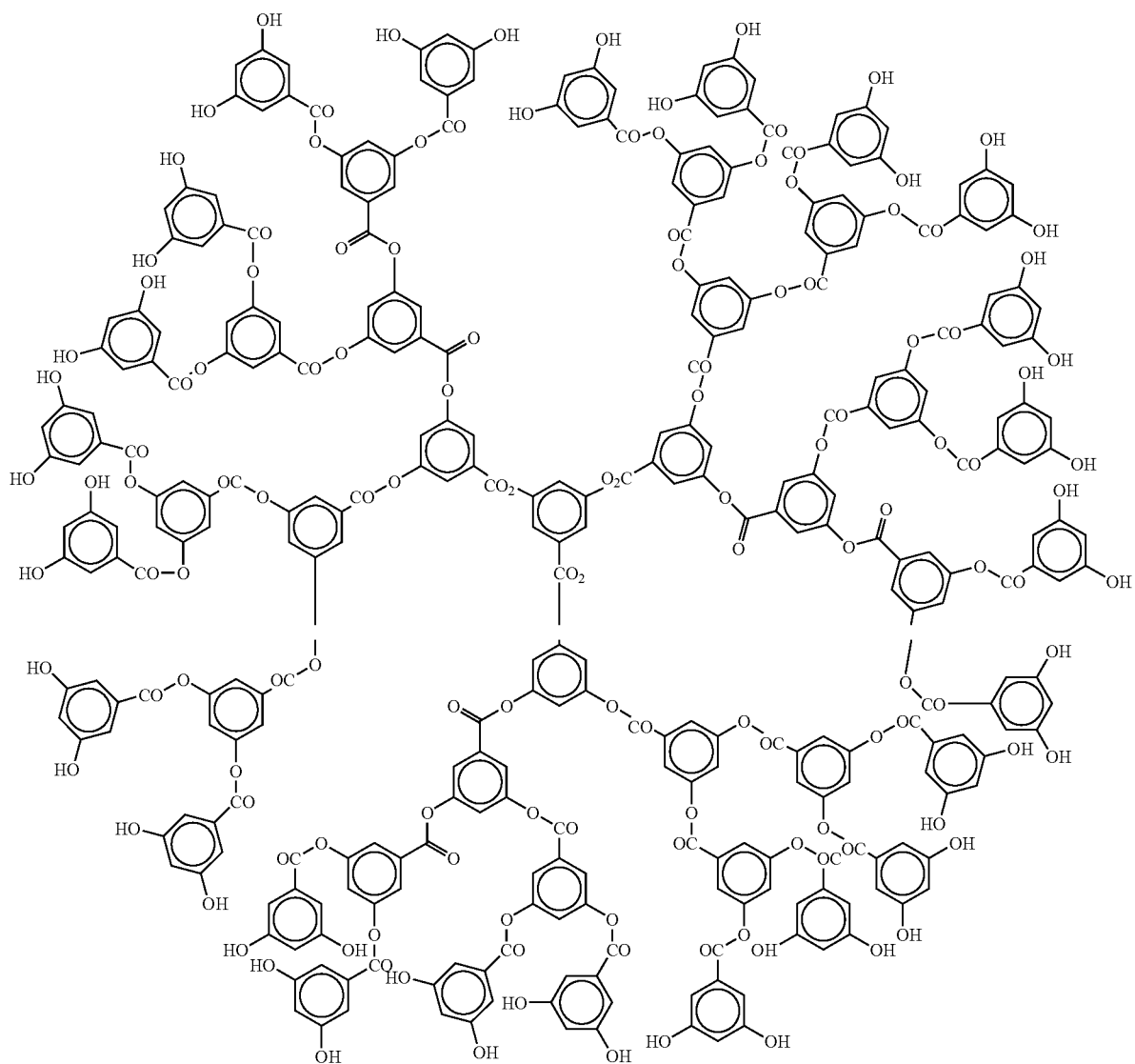
(29):G4-2

-continued
Formula 30
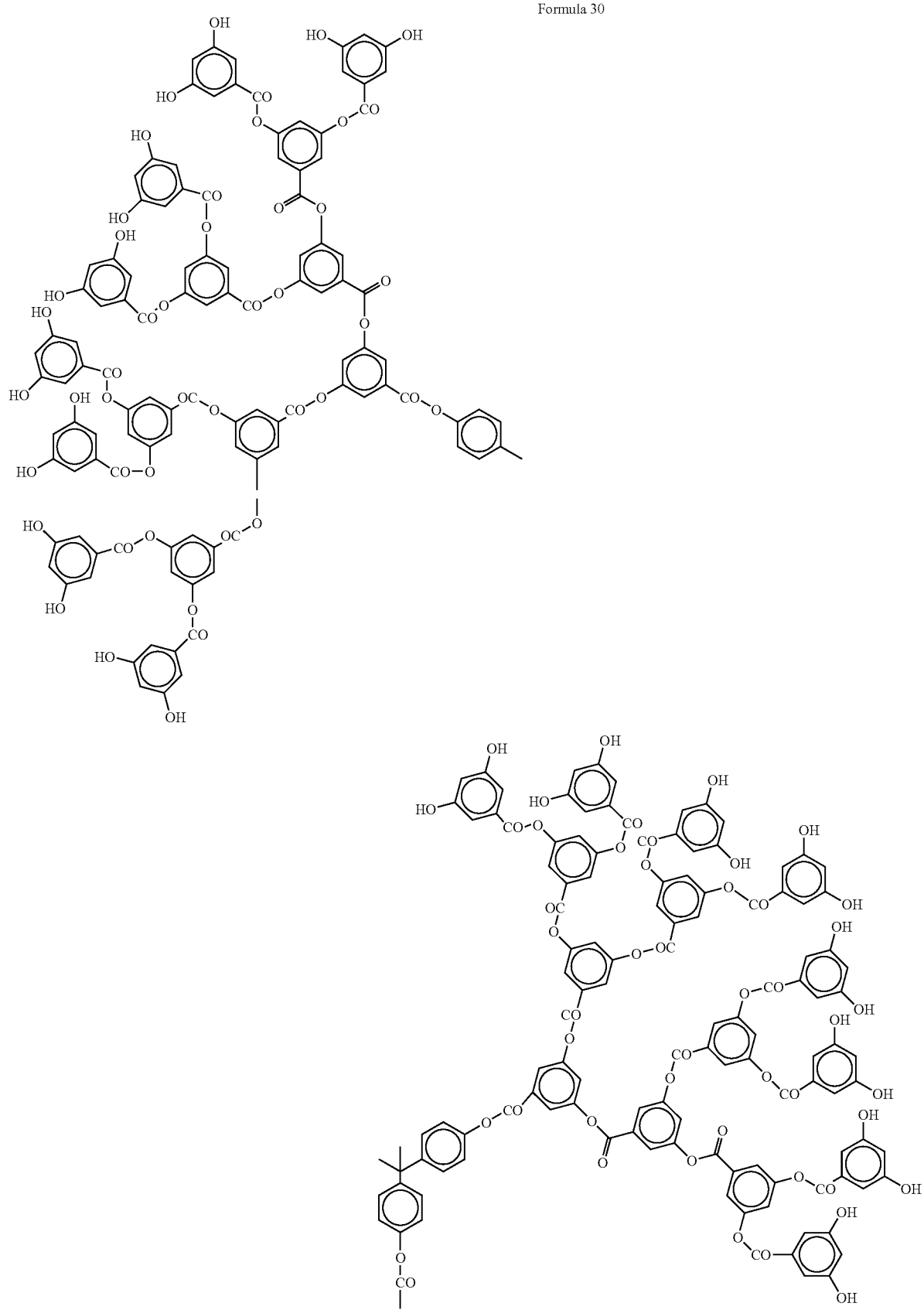

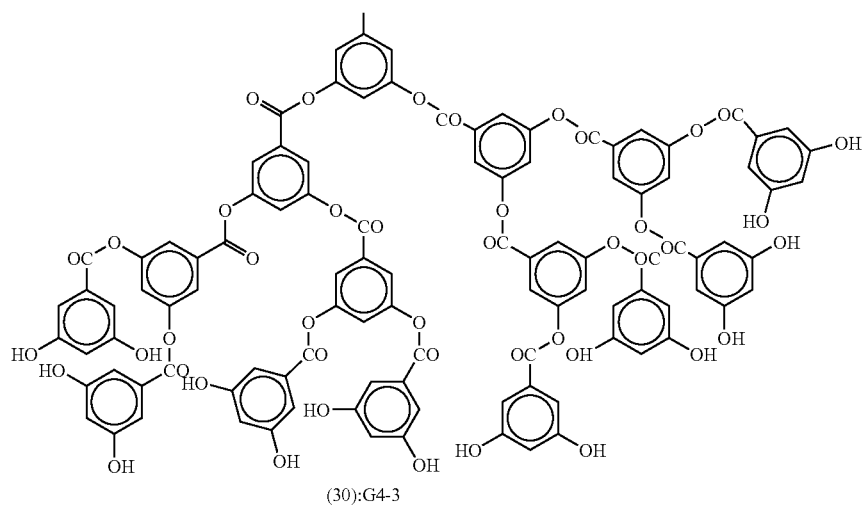
(30):G4-3
Formula 31
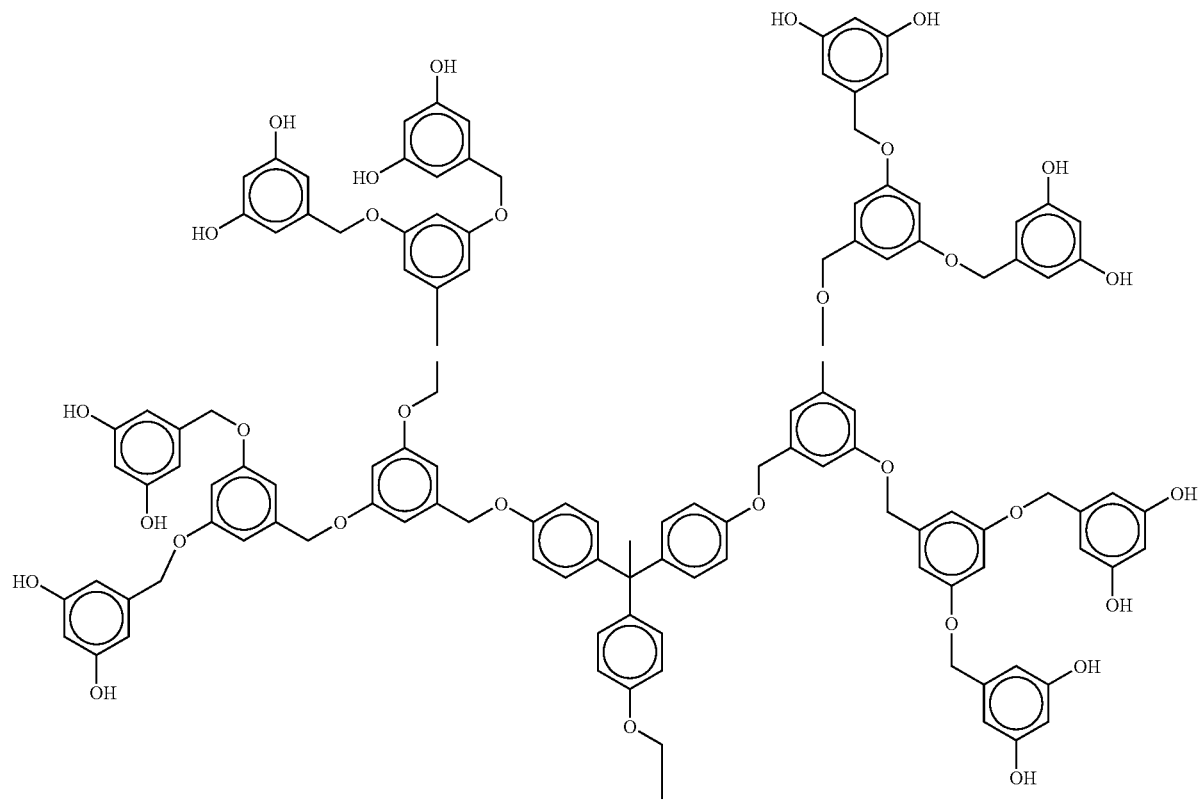

-continued

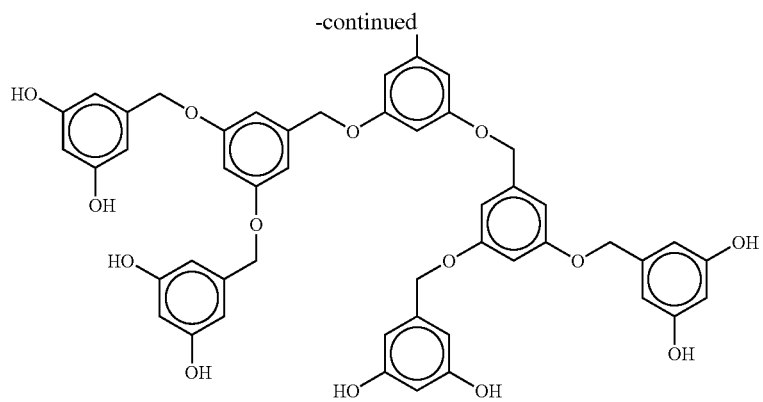

(31):G3-4

All the diverse precursors for optical dendrimers which are obtained in the above method include phenolic OH at ends evenly at a high density. Final optical dendrimers can be obtained by adopting the organic chromophores disclosed in Table 1 through chemical reactions.

Herein, the technology of the present invention will be described more in detail with reference to preferred examples in which optical dendrimers are prepared by combining organic chromophores to a dendritic compound. Each dendrimer is identified by using nuclear magnetic resonance spectroscopy (NMR), and gel-permeation chromatography (GPC) confirms that the distribution of molecular weight converges into 1, a value that agrees with a theoretical value.

EXAMPLE 1

The compound (1) of Formula 1 was obtained by refluxing 15.9 g of 3,5-dihydroxybenzoic acid and 18 g of 1,1,1-trichloroethanol in the presence of 1 g of sulfuric acid for two days and protecting ester groups with benzoic acid functional groups. In the meantime, the compound (2) was obtained by reacting the 3,5-dihydroxybenzoic acid with bromomethyl benzene in the presence of potassium carbonate and protecting phenolic OH groups.

The compounds (1) and (2) in the Reaction Formula 1, each 2.86 g and 7.02 g, were dissolved in 60 ml of tetrahydrofuran anhydride including 5.8 g of triphenylphosphine, and then reacted at 0° C. by slowly adding 3.5 ml of DEAD thereto. The solution was agitated at a room temperature for about one hour and then it was distilled with pressure until the solvent was reduced by two thirds, and then methanol was dropped thereto, thus obtaining white powdery compound (3) of Reaction Formula 1.

6.6 g of the obtained material was dissolved in a solution of 30 ml of acetic acid and 30 ml of tetrahydrofuran along with zinc powder, thus producing slurry. Here, the equivalent ratio of the obtained material and the zinc powder is 1:3. The slurry was agitated for 18 hours intensely. Insoluble floating matters was removed from the slurry. The slurry without the insoluble floating matter was diluted with ethylaceteate and washed with water. The organic solution was concentrated to afford a white powder and then sufficiently washed with hexane-acetic acid co-solvent. The product was re-crystallized from tetrahydrofuran and hexane. From these processes, a white powdery compound (4) of Reaction Formula 1 was obtained. Following are NMR data of the compound (4).

$^1$H-nmr (400 MHz; solvent: DMSO-d6; δ ppm) 7.80(s, 2H), 7.65(s, 1H), 7.47-7.30(m, 24H), 7.06(s, 2H), 5.15(s, 8H, benzyl), 3.39(br, 1H, —OH).

$^{13}$C-nmr (solvent: DMSO-d6; δ ppm) 165.77, 163.91, 159.65, 151.02, 136.59, 133.17, 130.49, 128.50, 127.99, 127.69, 120.59, 120.44, 108.70, 107.82, 69.72.

EXAMPLE 2

The compounds (2) or (4) obtained in the Example 1 were taken out 3.6 equivalents, individually and dissolved in a refined acetone together with 1,1,1-trihydroxyphenyl ethane. Subsequently, 1.5 equivalents of solid material (4-dimethyl amino pyridinium-p-toluene sulfonate: DPTS), which was obtained from an equivalent reaction between 4-dimethylamino pyridine and toluene sulfonic acid, and 3.6 equivalents of dicyclo hexylcarbodiimide (DCC) were added to acetone solution in an atmosphere of nitrogen, and then the solution was agitated at a room temperature for about two days, thus producing slurry. The slurry was filtrated to remove solid matters. Then, acetone was removed by around two thirds, and the resultant was refined by dropping the resultant in methanol, thus producing a compound (7) of Reaction Formula 2 or a compound (13) of Reaction Formula 4B. The compound (7) or (13) was dissolved in dichloromethane completely and methanol was added thereto in the same amount as the compound (7) or the compound (13) and three droplets of acetic acid were added thereto. Subsequently, about 5 wt % of 10% Pd—C was added in the resultant solution. Subsequently, it was reacted in an atmosphere of hydrogen at a pressure ranging from 10 to 15 atmospheres for about a day by using a high-pressure chemical reactor. A material obtained from the reactor was filtrated to remove Pd—C using cellite and concentrated. The resultant viscose material dissolved in a little amount of methanol was re-crystallized at a low temperature with an excessive amount of ethyl ether. Following are analysis data of the compounds (8) and (14).

The compound (8): $^1$H-nmr(400 MHz; solvent: acetone-d6; δ ppm) 8.75(s, 6H, OH), 7.25(m, 12H), 7.16(s, 6H), 6.66(s, 3H), 3.23(s, 3H, CH$_3$).

$^{13}$C-nmr (solvent: acetone-d6; δ ppm) 165.37, 159.61, 150.33, 147.22, 132.29, 130.40, 122.14, 109.08, 108.63, 52.46, 31.05.

The compound (14): $^1$H-nmr (400 MHz; solvent: DMSO-d6; δ ppm) 9.79(s, 12H, OH), 7.96(s, 6H), 7.72(s, 3H), 7.32(d, 6H, J=8.7 Hz), 7.21(d, 6H, J=8.7 Hz), 7.02(s, 12H), 6.56(s, 6H), 2.35(s, 3H, CH$_3$).

$^{13}$C-nmr (solvent: DMSO-d6; δ ppm) 164.40, 163.21, 158.82, 151.46, 148.76, 146.41, 131.25, 130.04, 129.51, 121.44, 121.07, 108.30, 107.95, 51.53, 33.51.

EXAMPLE 3

0.69 g of the compound (8) of Reaction Formula 2, which was obtained in the Example 2 as a precursor for an optical dendrimer, and 6.3 equivalents (i.e., 4.85 g) of duple connected aminophenyl isophorone dicyanide(DAIDC), which was to be an organic chromophore, were dissolved in 40 ml of tetrahydrofuran anhydride sufficiently. Here, the DAIDC was a DAIDC of Table 2 where B and R are CH$_2$ and CH$_3$, respectively, and n is 1.

Subsequently, 8.3 equivalents (i.e., 2.12 g) of triphenyl phosphine was added to the above solution, and 1.34 ml of DEAD was divided into four portions and each portion of DEAD was added thereto once every 30 minutes for two hours. The mixture was agitated for one day and it was poured in 0.3 l of methanol slowly to be precipitated. The obtained precipitate was dried in the air, and then it was dissolved again in tetrahydrofuran at a weight ratio of 12%. The solution was re-precipitated in methanol, again, to remove remaining chromophores and reaction byproducts. From this process, red powdered compound 34 was obtained and it was dried in a vacuum condition. This reaction is illustrated in Reaction Formula 11 below. In a similar method, a compound (32) and a compound (33) can be obtained based on Reaction Formulas 9 and 10.

Reaction Formula 9

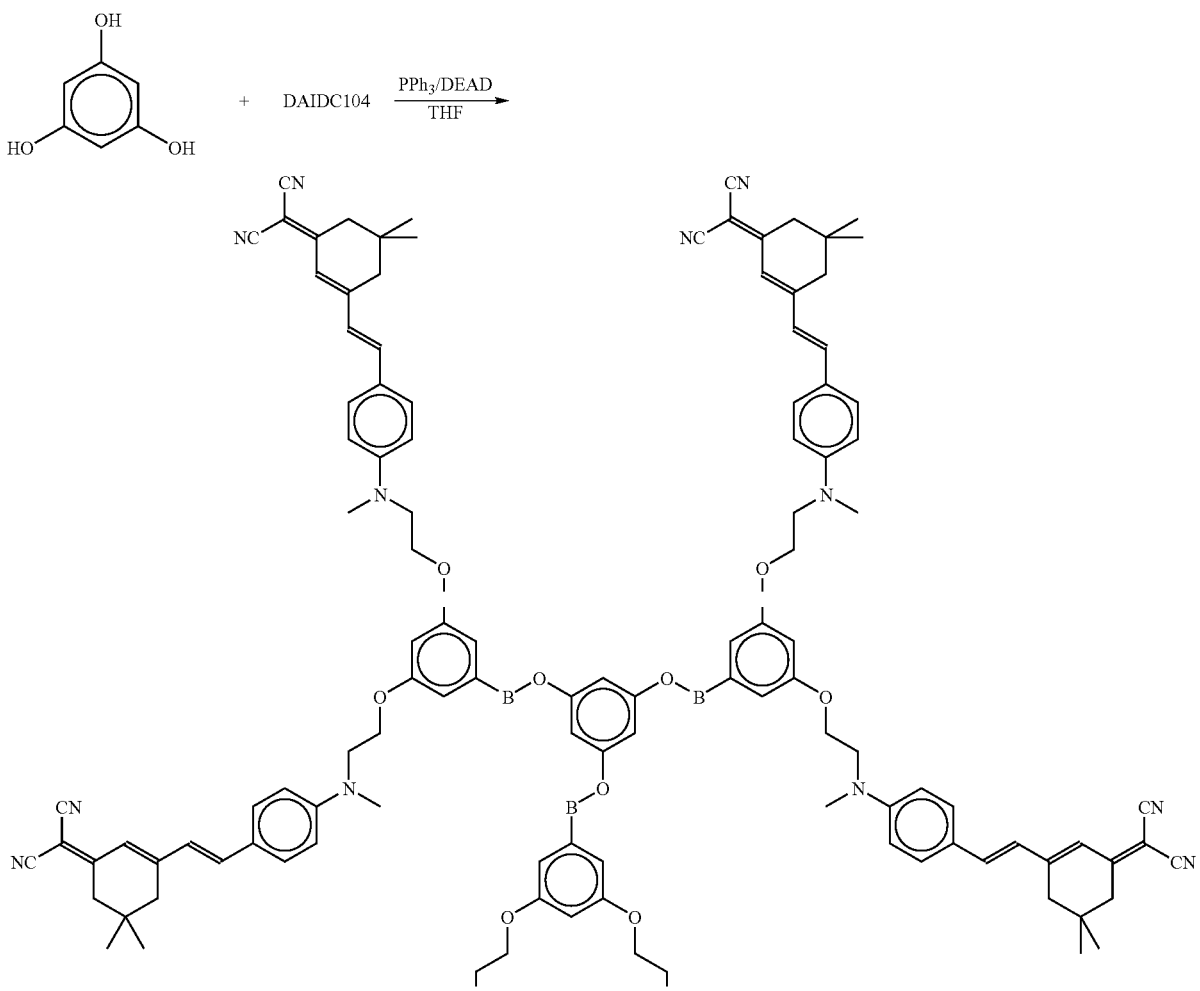

-continued
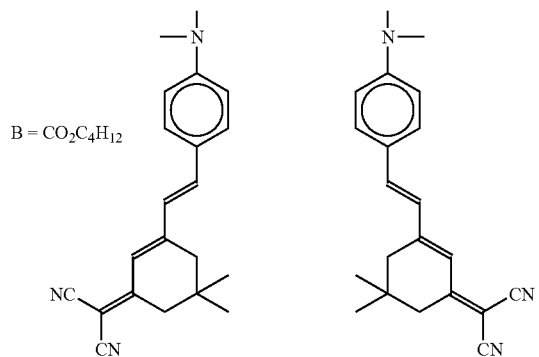
(32) TDAIDC104
Reaction Formula 10
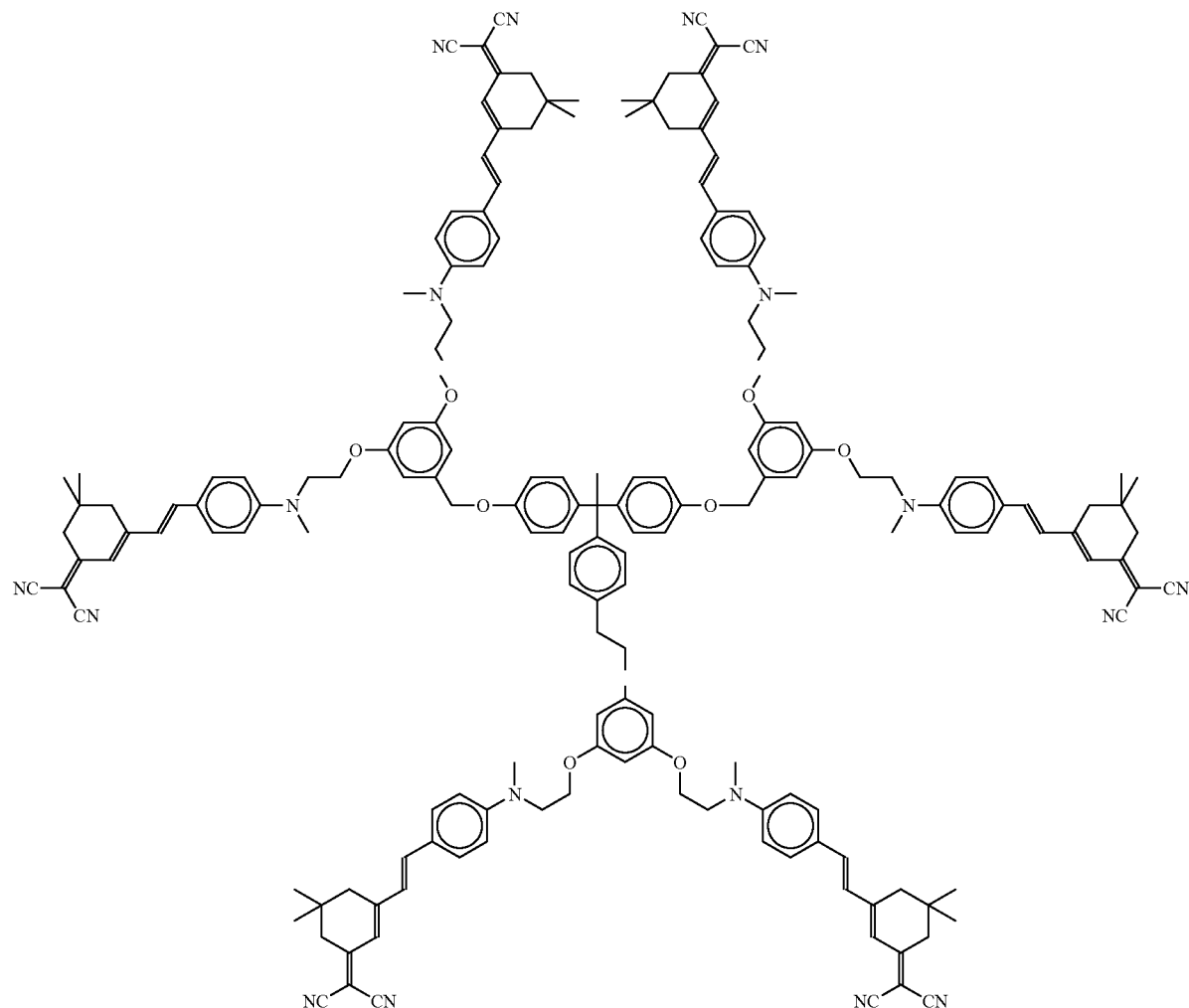
(33) THPEDAIDC
Reaction Formula 11

-continued
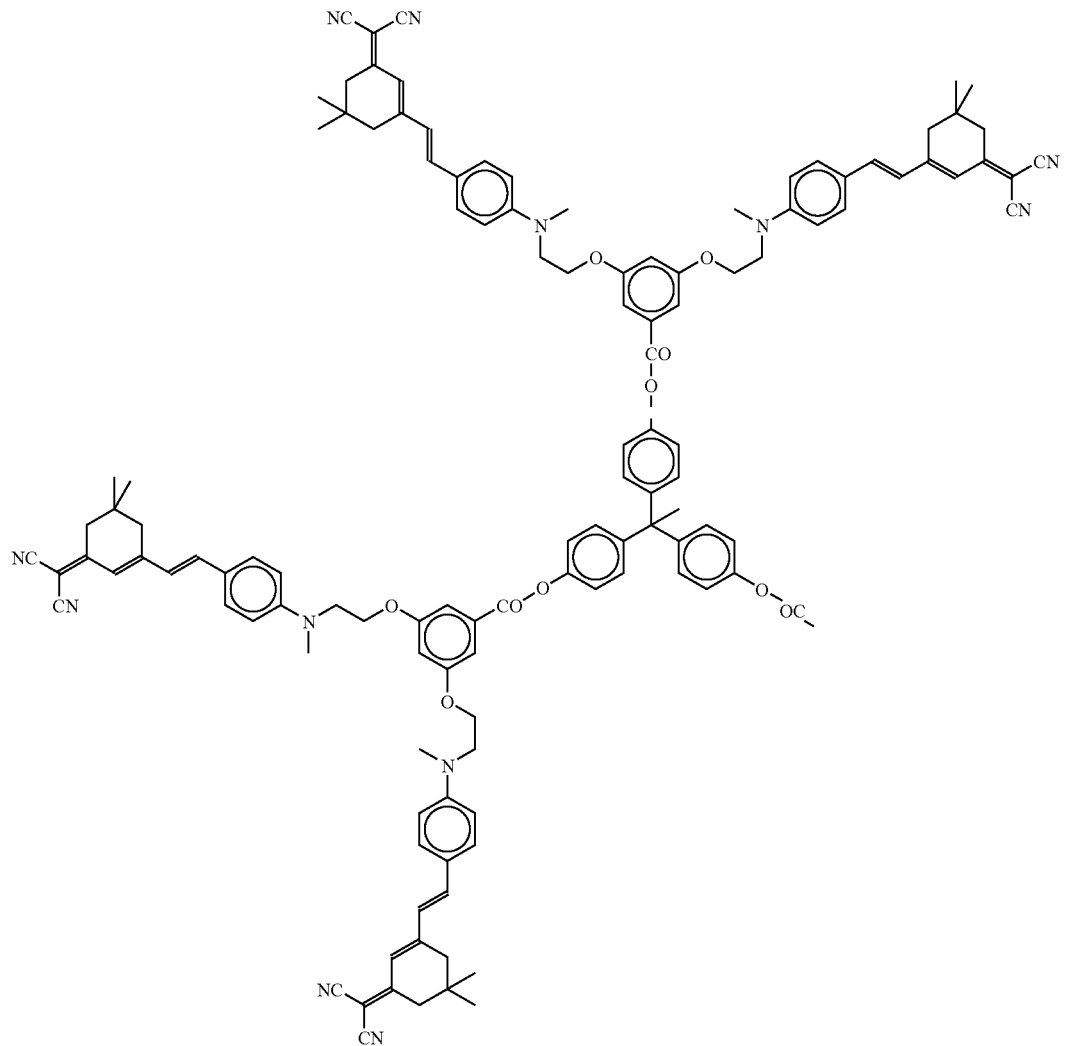
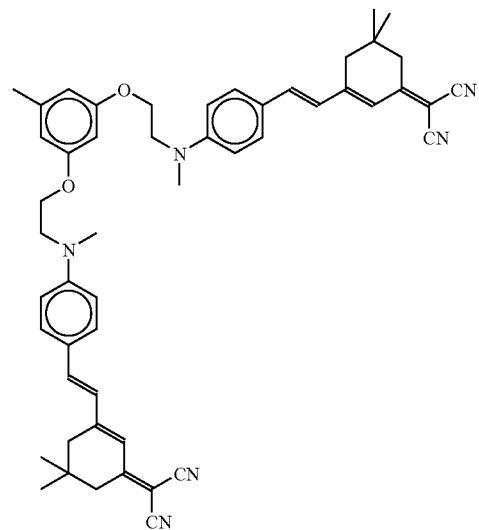
(34) G1-3 AIDC

Following are measured data of the compound (34).

$^1$H-nmr (400 MHz; solvent: CDCl$_3$; δ ppm) 7.36(m, 28H), 7.23-7.10(m, 13H), 6.99-6.95(m, 15H), 6.81-6.66(m, 49H), 6.54(s, 12H), 6.34(s, 6H), 4.95(s, 12H, —PhCH$_2$—O), 4.11(br s, 24H, OCH$_2$CH$_2$N), 3.77(br s, 24H, OCH$_2$CH$_2$N), 3.05(s, 36H), 2.48(s, 24H), 2.38(s, 24H), 2.26(s, 3H), 1.00(s, 72H).

UV absorption spectrum: λ max=505 nm(CHCl$_3$)

Glass transition temperature (Tg, DSC thermal analysis) =165° C.

EXAMPLE 4

0.505 g of the compound (14), which was obtained as a precursor for an optical dendrimer in the Example 2, and 13.2 equivalents (i.e., 3.5 g) were dissolved in 30 ml of tetrahydrofuran anhydride sufficiently. Then, 14.4 equivalents (i.e., 1.25 g) of triphenyl phosphine was added to the solution in the presence of nitrogen, and 0.77 ml of DEAD was added thereto once every 30 minutes for 8 hours. Each time, a fourth of the DEAD was added. The solution was agitated for one day at a room temperature and precipitated slowly by being dropped in 0.3 l of methanol. The obtained precipitate was dried in the atmosphere and then dissolved again in 12 wt % of the tetrahydrofuran. The solution was re-precipitated in methanol to remove remaining chromophores and reaction by-products, thus producing a red powdery compound (37). The red powdery compound (37) was dried in a vacuum condition based on Reaction Formula 14 and used. In a similar method, a compound (35) and a compound (36) can be prepared based on Reaction Formulas 12 and 13.

Reaction Formula 12

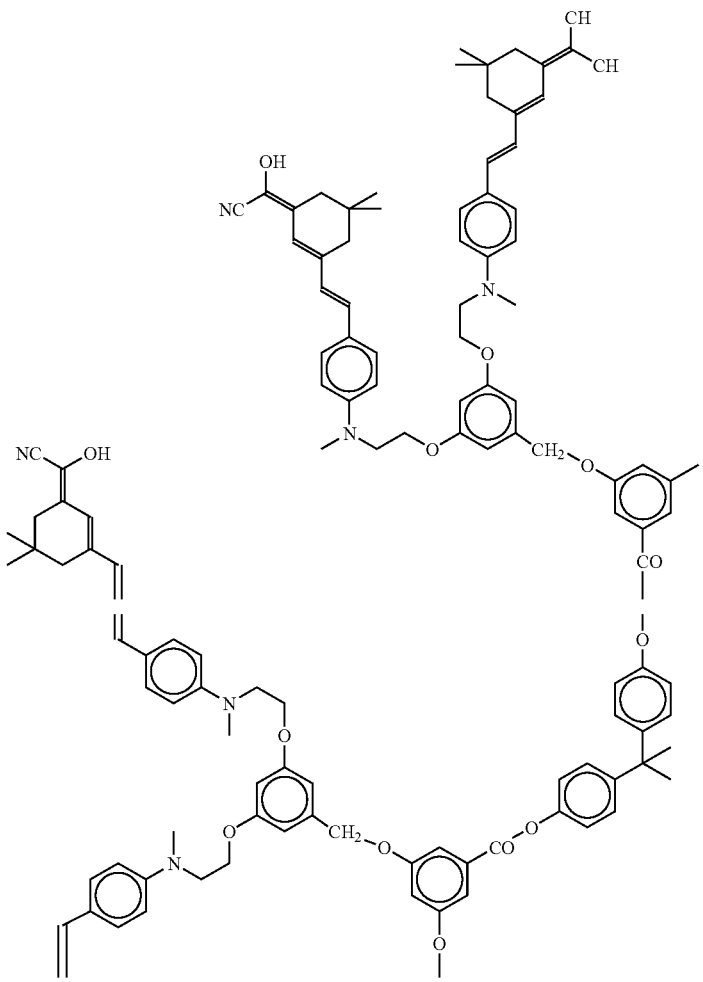

-continued
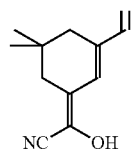
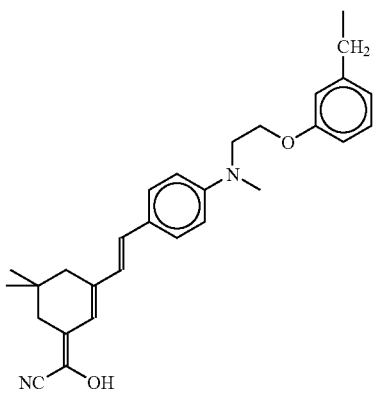
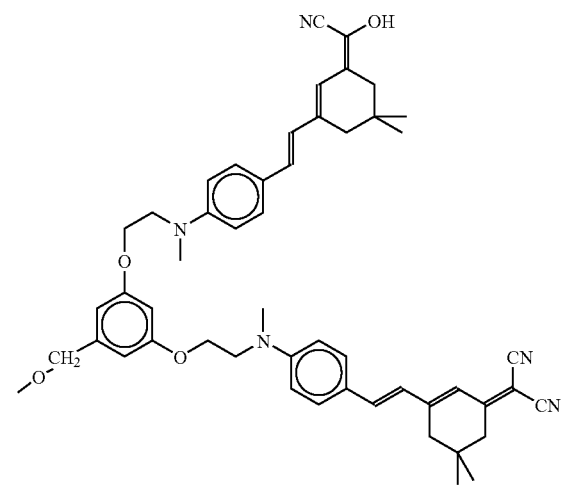
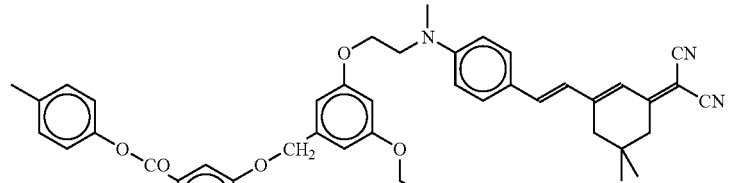
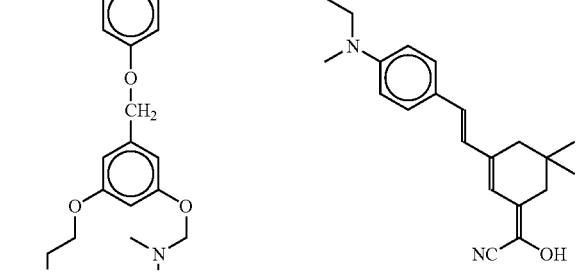
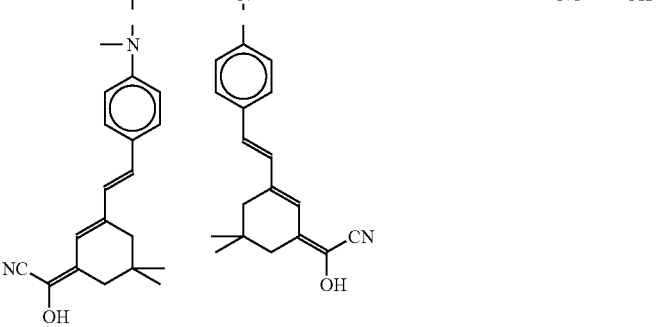
(35) G2-3 AIDC -continued
Reaction Formula 13
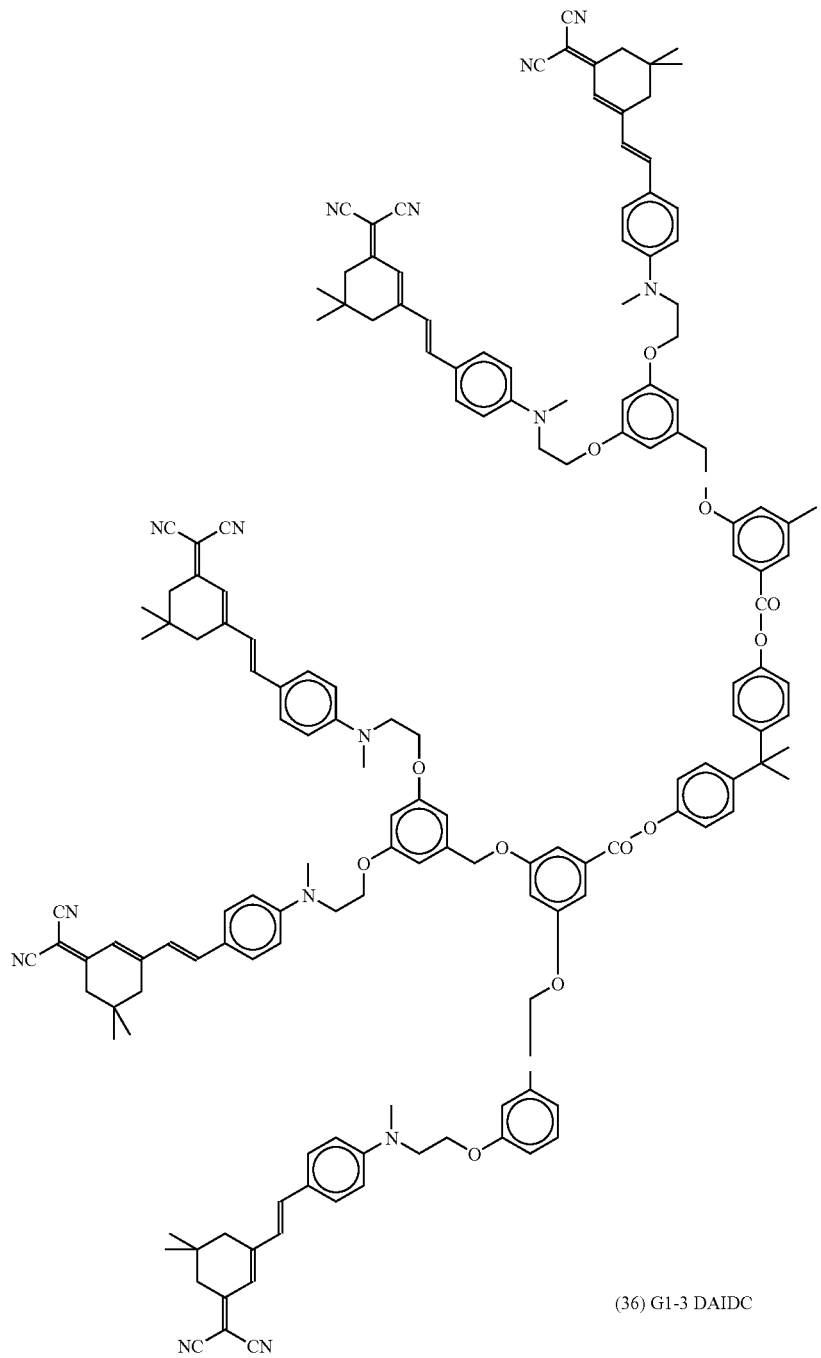
(36) G1-3 DAIDC -continued
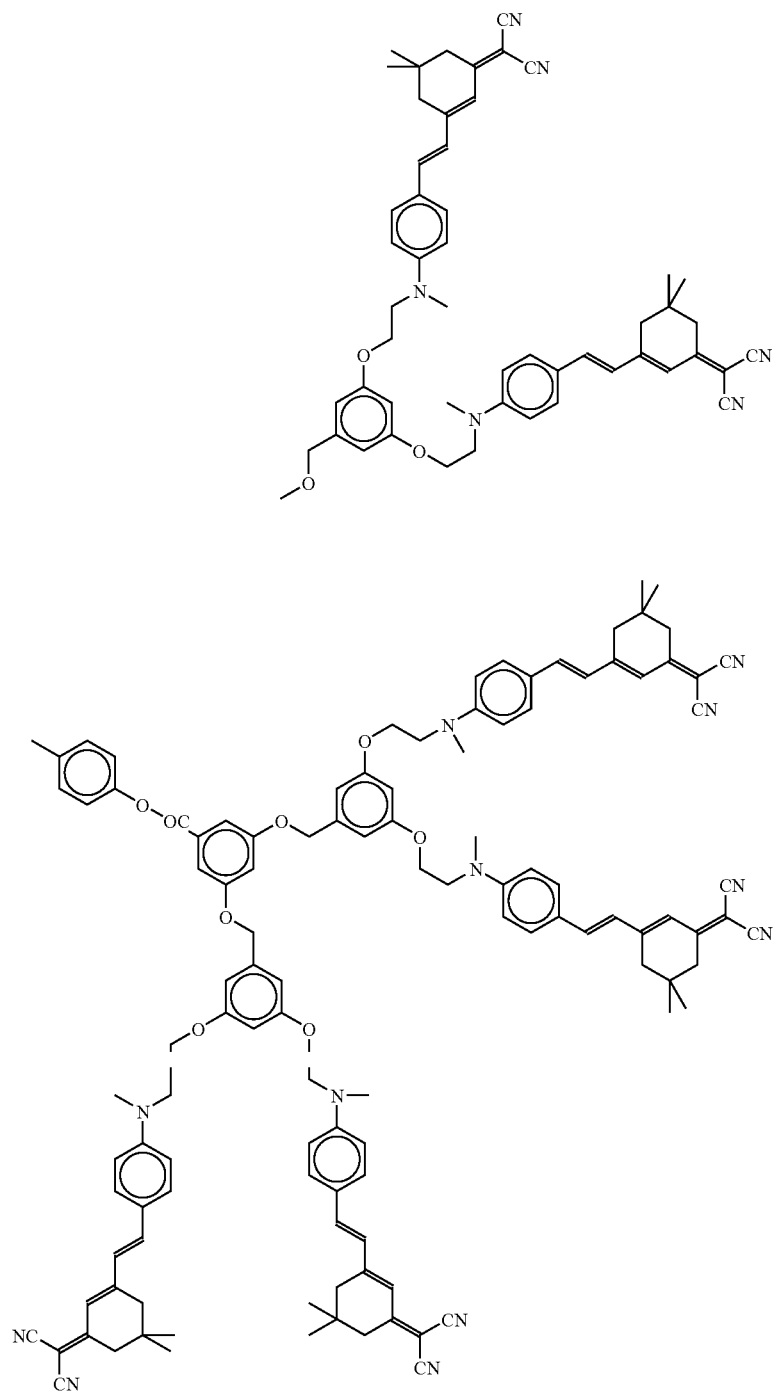
Reaction Formula 14
G2-3 (14) + DAIDC $\xrightarrow{\text{PPh}_3/\text{DEAD}}$ THF -continued
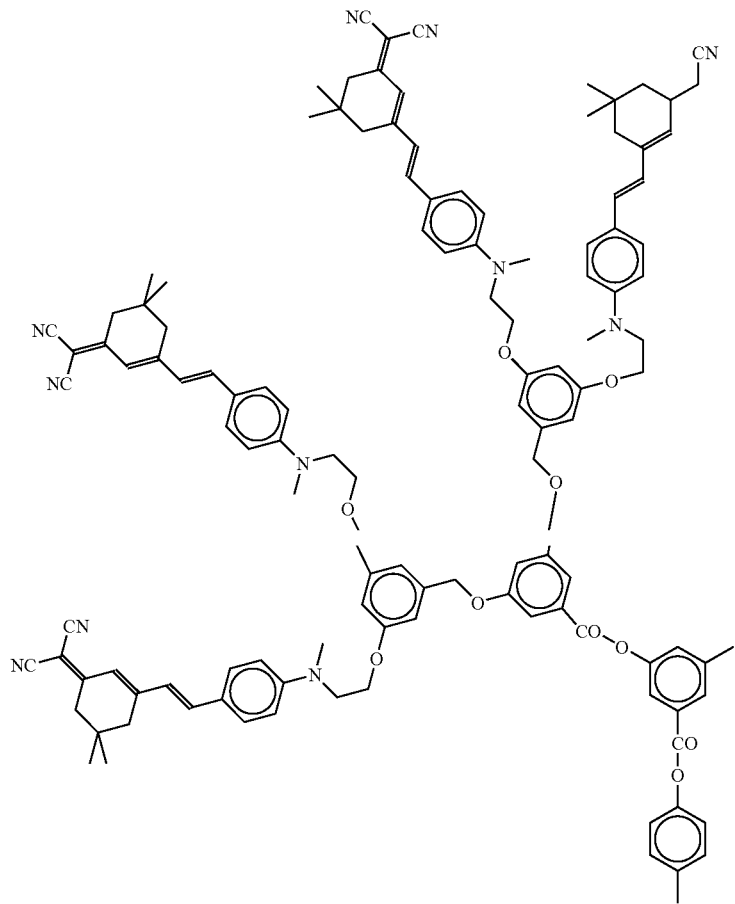
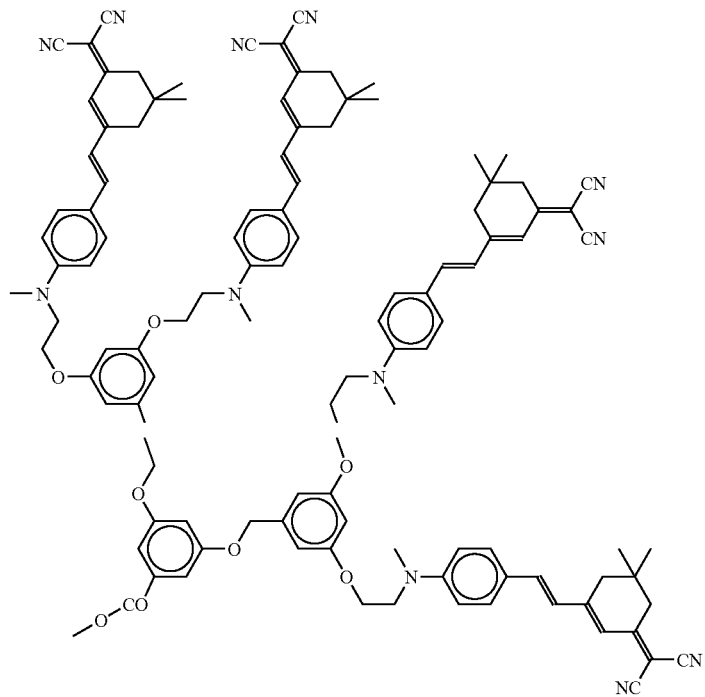

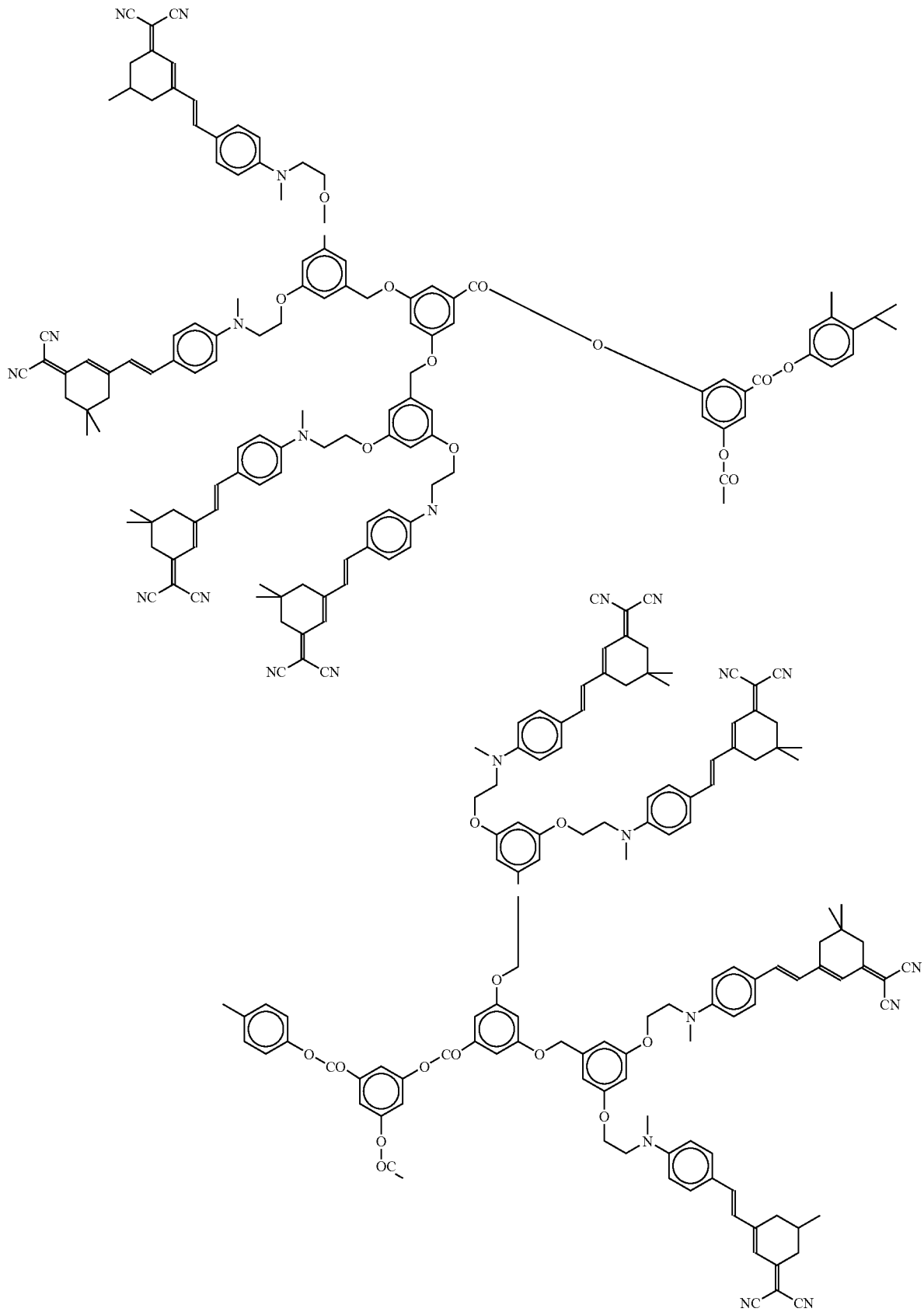

-continued

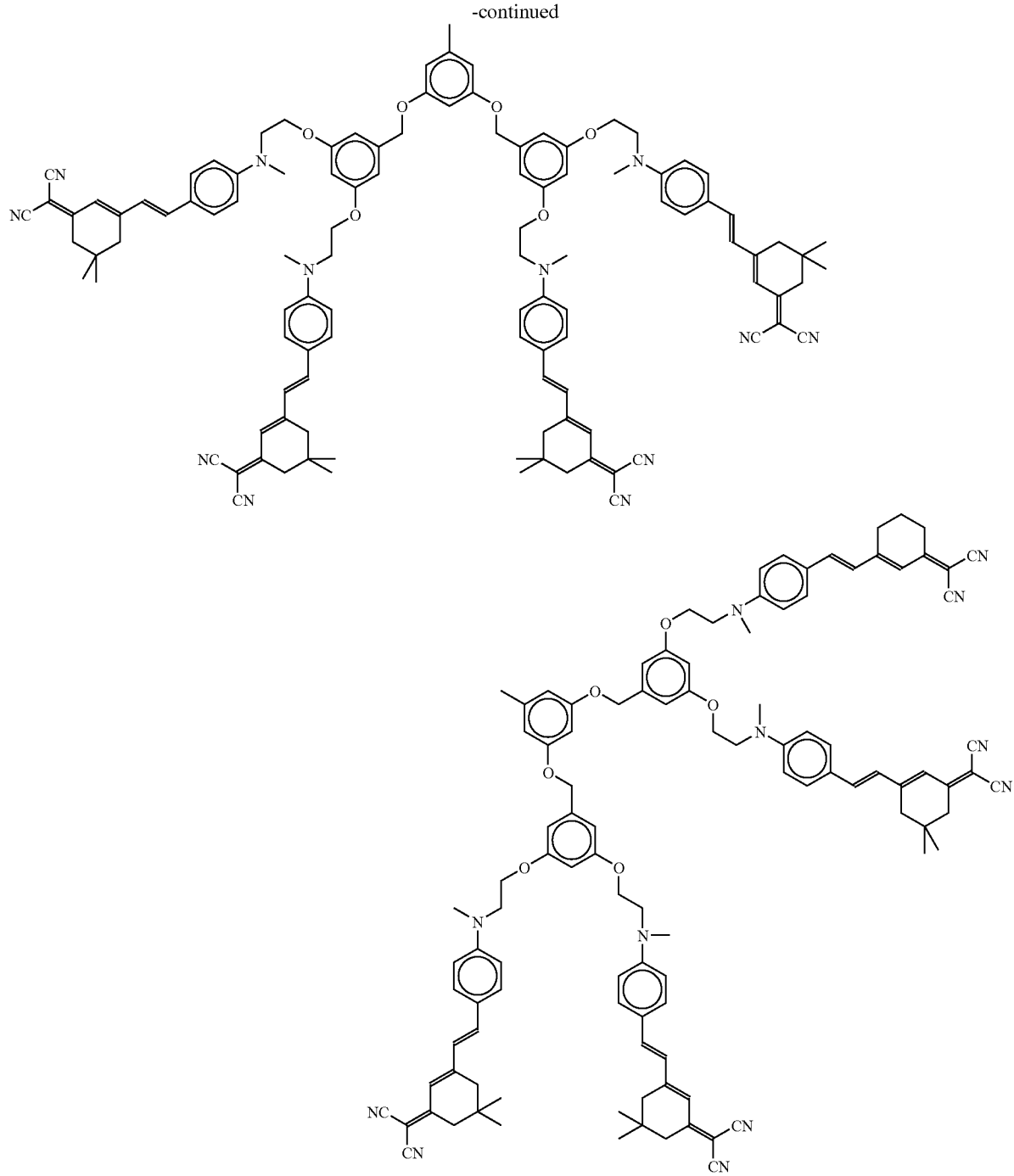

(73) G2-3 DAODC

Following are measured data of the obtained compound (37) in Reaction Formula 14.

$^1$H-nmr (400 MHz; solvent: CDCl$_3$; δ ppm) 7.91-7.25(m, 56H), 7.23-7.10(m, 15H), 6.99-6.93(m, 24H), 6.81-6.53(m, 99H), 6.54(m, 25H), 6.33(s, 24H), 4.95(s, 24H, —PhCH$_2$—O), 4.09(br s, 48H, OCH$_2$CH$_2$N), 3.75(br s, 48H, OCH$_2$CH$_2$N), 3.08(s, 72H), 2.53-2.18(m, 99H), 0.99(s, 144H).

UV absorption spectrum: λ max=505 nm(CHCl$_3$)

Glass transition temperature (Tg, DSC thermal analysis)= 145° C.

EXAMPLE 5

The optical polymer dendrimers obtained in the third and the Example 4 were measured out 1 g, individually, and dissolved in 20 g of a 1,2,3-trichloropropane solvent to prepare a solution of 15% by mass for about 10 hours sufficiently. Then, the solution was filtrated with a filtering film (polytetrafluorethylene; PTFE) having pores of 0.2 μm to remove all fine particles.

Subsequently, a film having a thickness ranging from around 2 to around 3 μm was fabricated by performing rotatory molding on an indium tin oxide (ITO) glass substrate at a speed of 600 rpm/20 sec and drying it at a temperature of 150° C. under a vacuum condition for 10 hours. On top of the film, a top electrode was formed by depositing gold in a depth of 0.1 μm. To examine the optical properties of a material, electro-optical (EO) coefficients of the optical dendrimers were measured and shown in Table 2 below.

TABLE 2

EO coefficients of optical dendrimers

|  | Compounds | Dendrimers | Tp | EO-Coefficient, $r_{33}$ (pm/V) TDAIDC104 | 150 V/μm | Content of Chromophores (AIDC), % |
|---|---|---|---|---|---|---|
| Example 3 | (32) | TDAIDC104 | 133° C. | 26.6 | 36.2 | 76 |
|  | (33) | THPEDAIDC | 165° C. | 19.6 | 28.0 | 78 |
|  | (34) | G1-3 AIDC | 160° C. | 19.0 | — | 77 |
| Example 4 | (35) | G2-3 AIDC | 165° C. | 21.0 | — | 75 |
|  | (36) | G1-3 DAIDC | 170° C. | 29.3 | 43.4 | 77 |
|  | (37) | G2-3 DAIDC | 170° C. | 19.5 | 25.7 | 76 |

Table 2 shows optical property values of representative optical dendrimers prepared in accordance with the present invention. $T_p$, which stands for temperature poling, is the most effective temperature during electric contact poling. AIDC is a chromophore in a synthesized dendrimer. In Table 1, the theoretical amount of the chromophore AIDC is calculated based on a ratio of weight. TDAIDC104 tends to have a decreasing glass transition temperature. This is because the dendrimer structures include chain-type alkyl links. The optimum temperature of TDAIDC104 appears lower than other materials in an electric field.

The relationship between the intensity of an electric field and the electro-optical coefficient of the compound (36) is shown as a graph in FIG. 1.

The graph of FIG. 1 shows that the compound (36) has a general tendency that the electro-optical coefficient is in proportion to the intensity of an applied electric field.

The compound (36) has a property of a dendrimer which shows high stability in a high electric field even in the atmosphere, which is not a special environment filled with nitrogen and/or argon.

Figure 2:
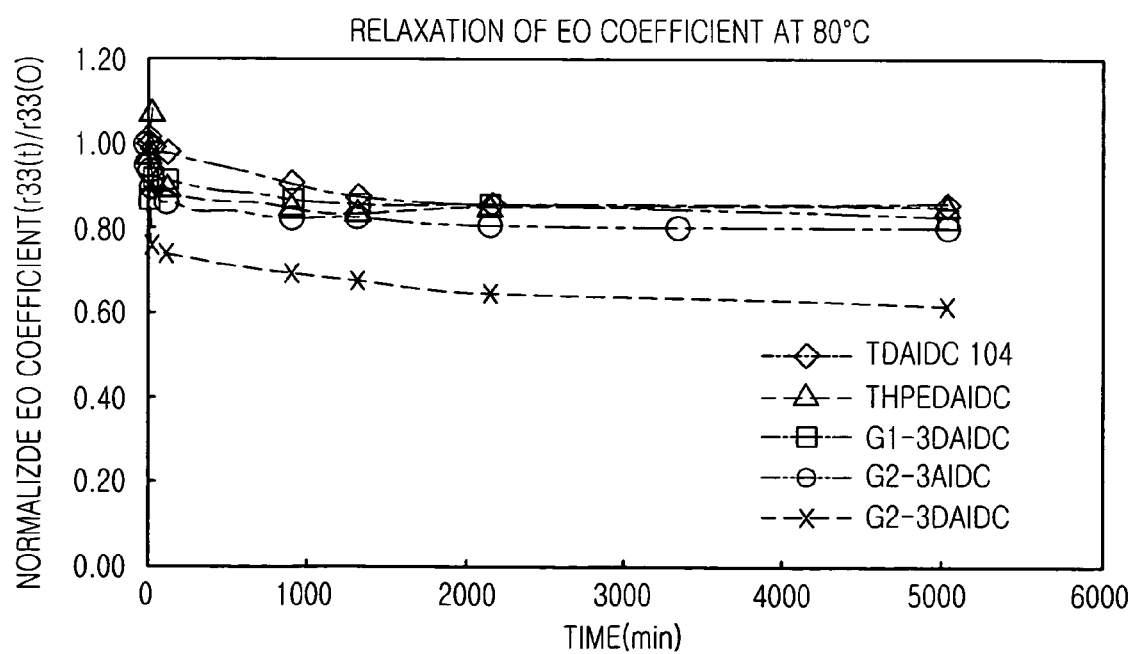
FIG. 2 is a graph depicting stabilities of the electro-optical coefficient of optical dendrimers at 80° C., the optical dendrimers being obtained from the examples of the present invention.
Figure 3:
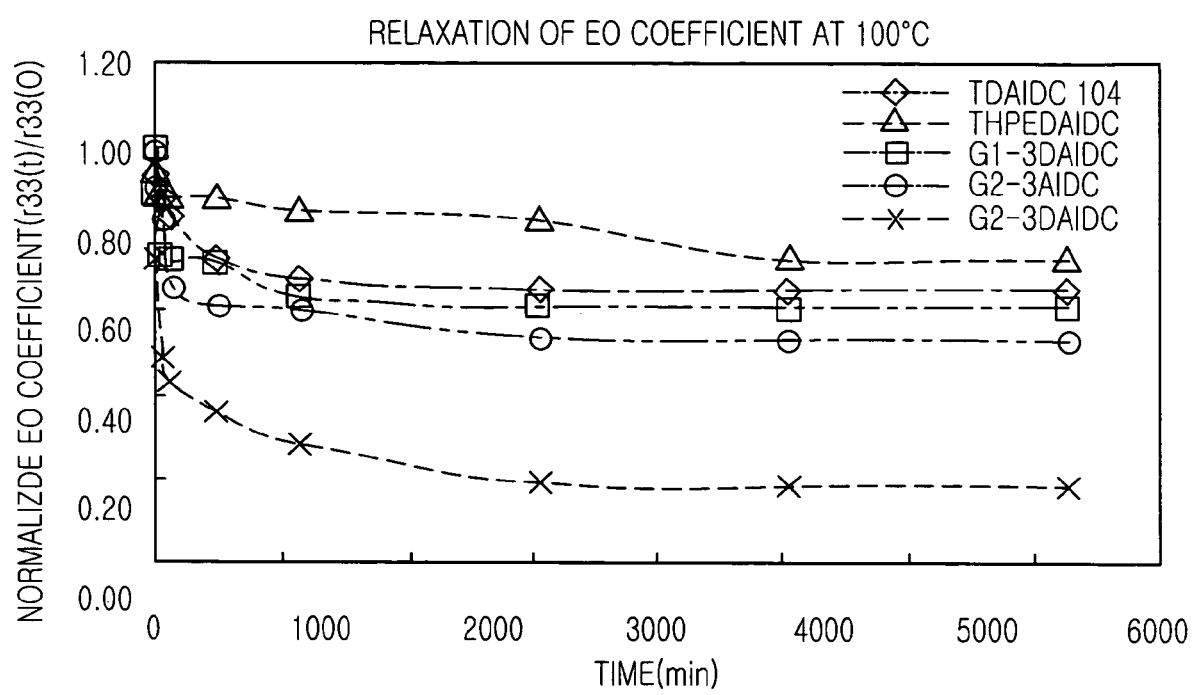
FIG. 3 is a graph describing stabilities of the electro-optical coefficient of the optical dendrimers at 100° C., the optical dendrimers being obtained from the examples of the present invention.

To measure reliability and stability of the values obtained in Table 2, a dendrimer film positioned in the electric field is left alone for a long time in the conditions of several different temperatures, and their optical coefficients are measured. FIG. 2 presents a graph depicting stabilities of the electro-optical coefficient of optical dendrimers at 80° C. FIG. 3 is a graph describing stabilities of the electro-optical coefficient of the optical dendrimers at 100° C. The optical dendrimers are obtained from the examples of the present invention.

When the optical coefficients of the dendrimers are measured at 80° C., the dendrimers other than the compound (32) having a low glass transition temperature can maintain stability only after they generate about 10 to 15% loss. When the optical coefficients are measured at 100° C., the dendrimers produce more loss. 80% of the compound (32) has been restored and the other dendrimers have produced about 30 to 40% loss, but they become stable after a predetermined time.

The technology of the present invention described above is not limited by the afore-described examples and/or reaction formulas, but they can be substituted, changed or modified within the concept and scope of the present invention.

The present invention is designed to develop a nonlinear optical material having a new polymer structure. Conventional nonlinear optical materials have monomolecular crystal structures or a structure side chains are linked to a linear polymer. However, the present invention suggests a dendrimer structure which is a three-dimensional globular structure.

A dendrimer has a structure of a monomolecule, but since it has a large molecular weight, it has more of the properties of polymers rather than those of monomers. Also, because it has a high connection ability at its ends, it can easily introduce nonlinear optical chromophores, which are shown in the present invention. So, it can increase the concentration of the chromophores up to 78%, a concentration which conventional linear polymers cannot possibly reach. The dendrimer has a structure completely free from unstable factors at the ends of linear polymers. Therefore, it has increased thermal and optical stability. The non-linear optical dendrimers of the present invention can be prepared from low-degree simple-structured molecules to high-degree larger molecules sequentially through a synthetic method. Since the dendrimer structure is formed based on simple and stable linkages such as ester linkages and ether linkages, it generates small optical loss when it is used for optical communication application.

While the present invention has been described with respect to certain preferred examples, it will be apparent to those skilled in the art that various changes and modifications may be made without departing from the scope of the invention as defined in the following claims.

What is claimed is:

1. A non-linear optical material, comprising:
   organic chromophores coupled with the ends of a polymer having a dendrimer structure based on ester linkages and/or ether linkages, the dendrimer structure having symmetry along three dimensions, wherein the polymer couples to said chromophore at a pendant OH group forming an ester or ether linkage; and
   the polymer having a dendrimer structure is any one selected from the group consisting of polymers illustrated as Formulas 21, 23, 28, 6, 12, 16, 29, 8, 14, 18, 30, 25, 27 and 31:

Formula 21
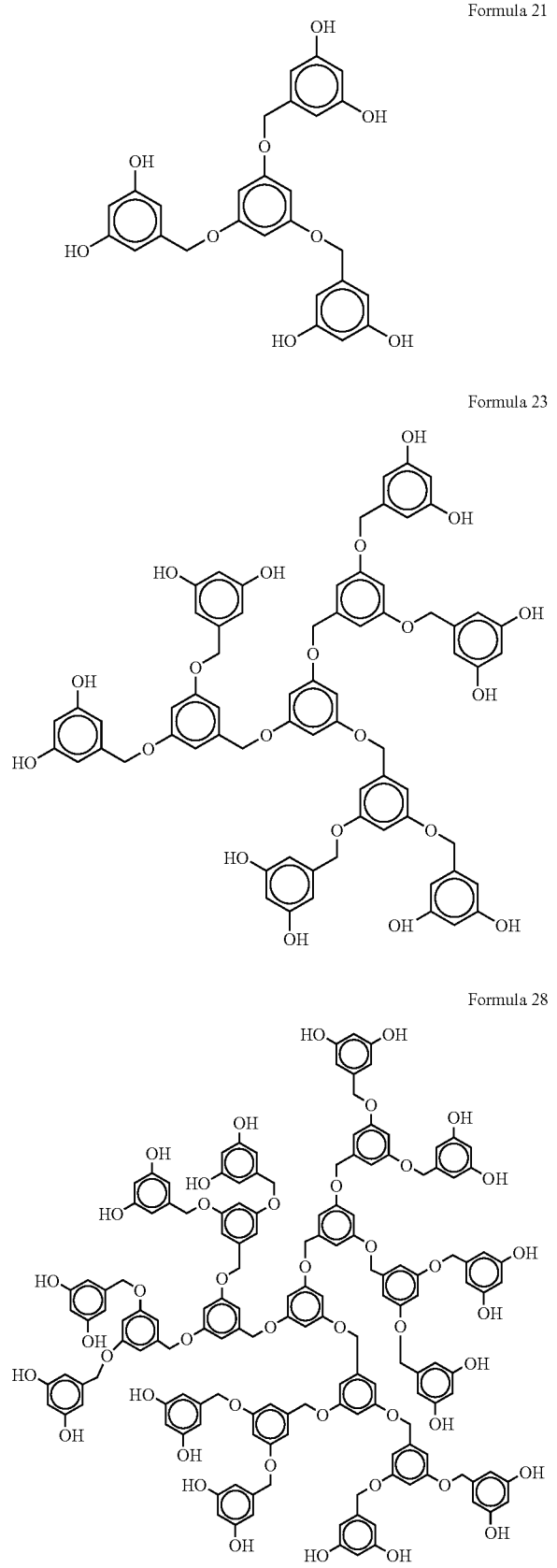
Formula 23
Formula 28
-continued
Formula 6
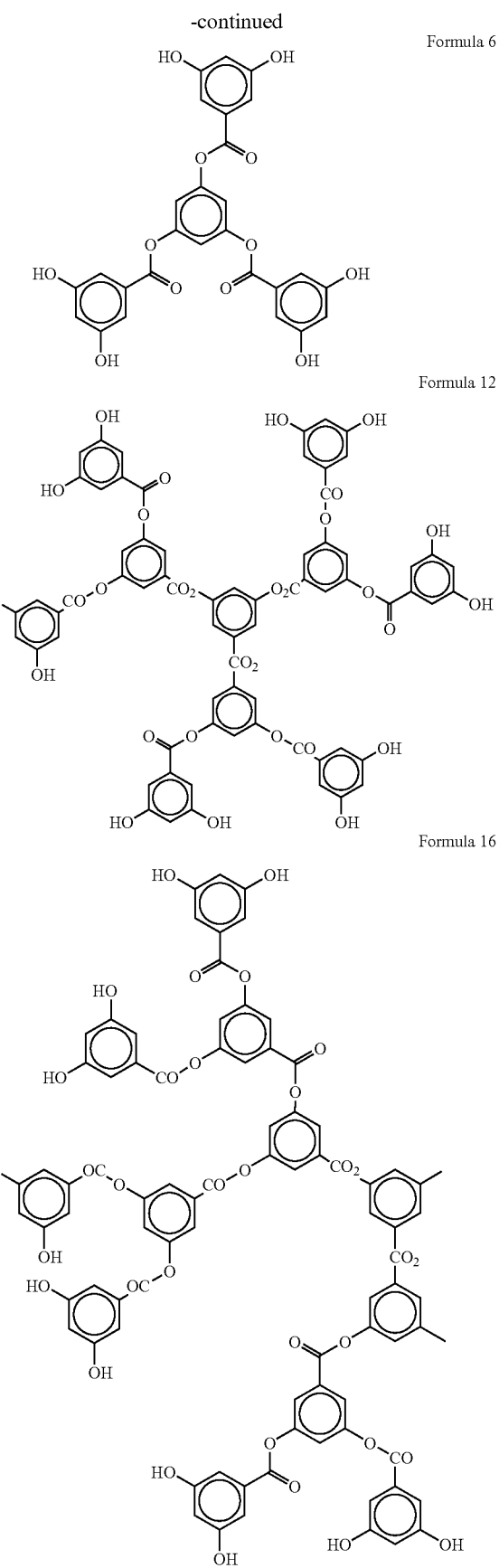
Formula 12
Formula 16

-continued
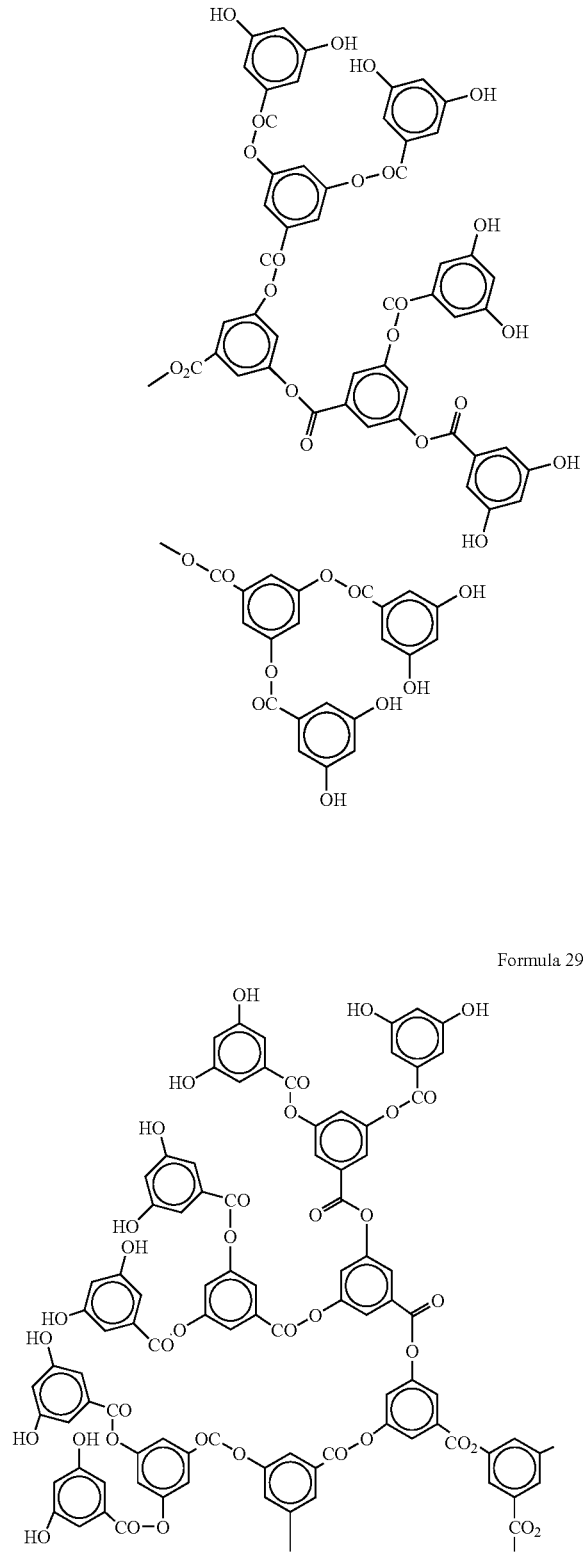
Formula 29
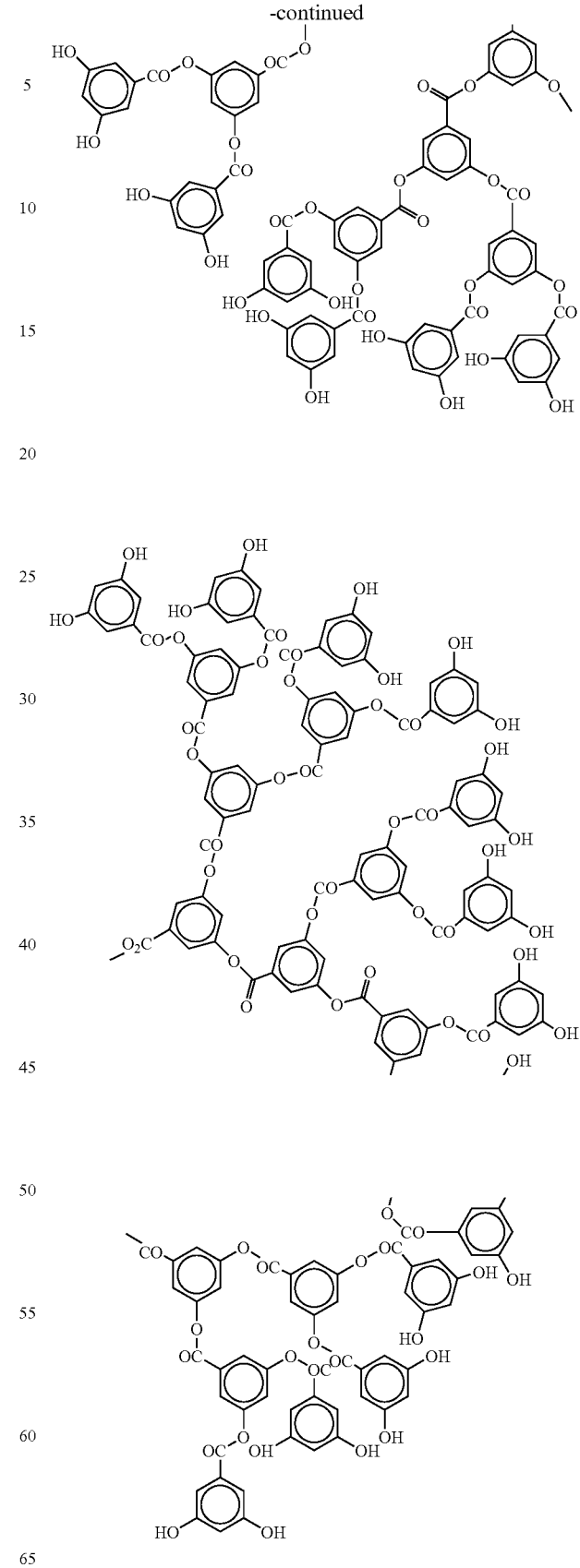

-continued
Formula 8
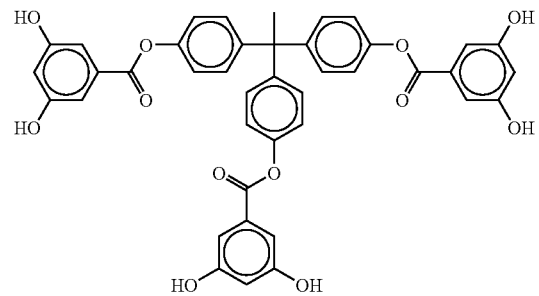
Formula 18
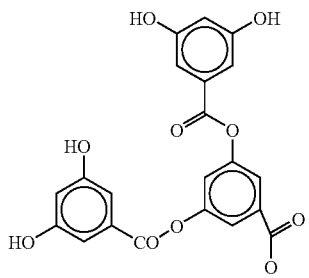
Formula 14
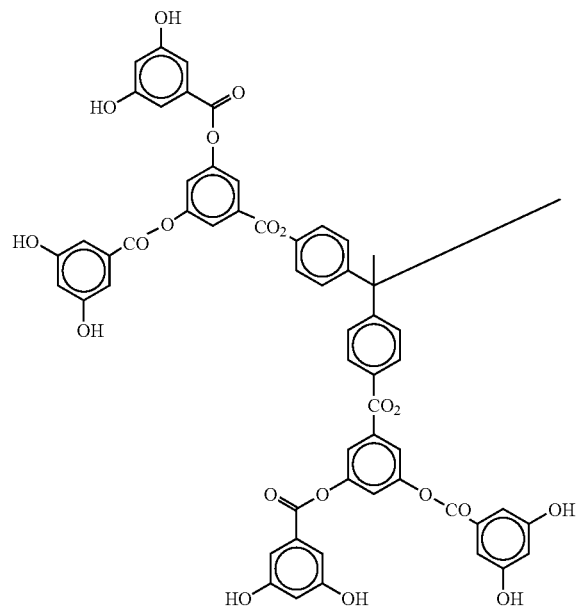
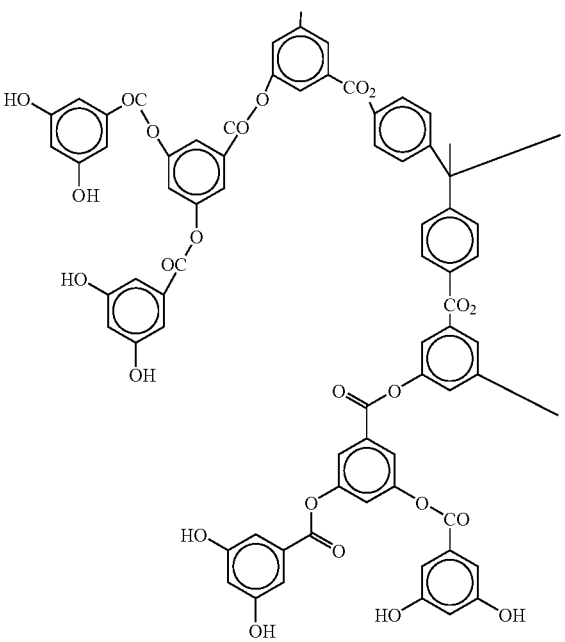
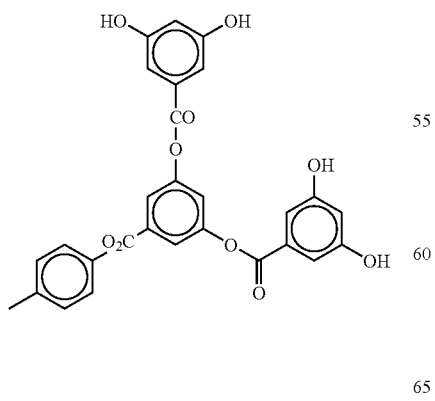
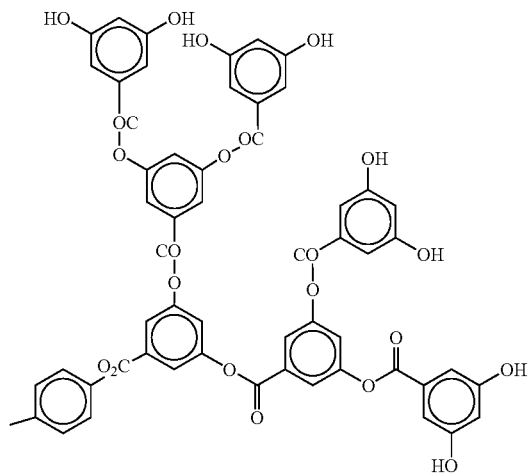

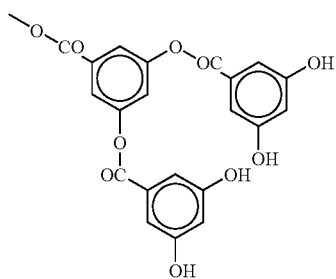
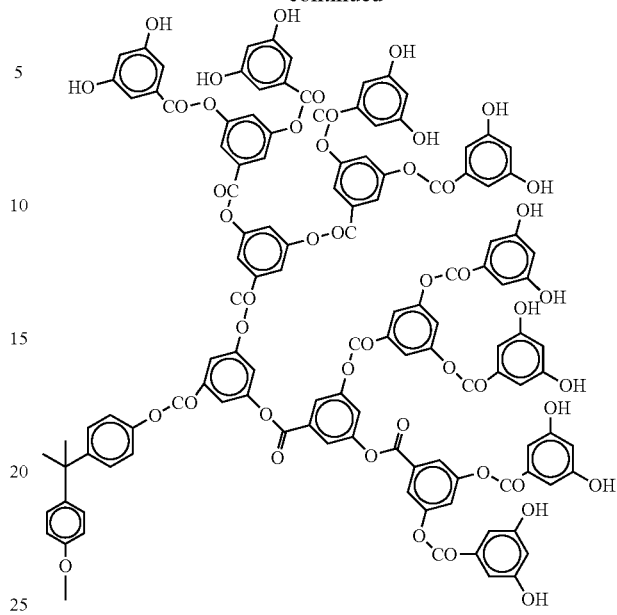
Formula 30
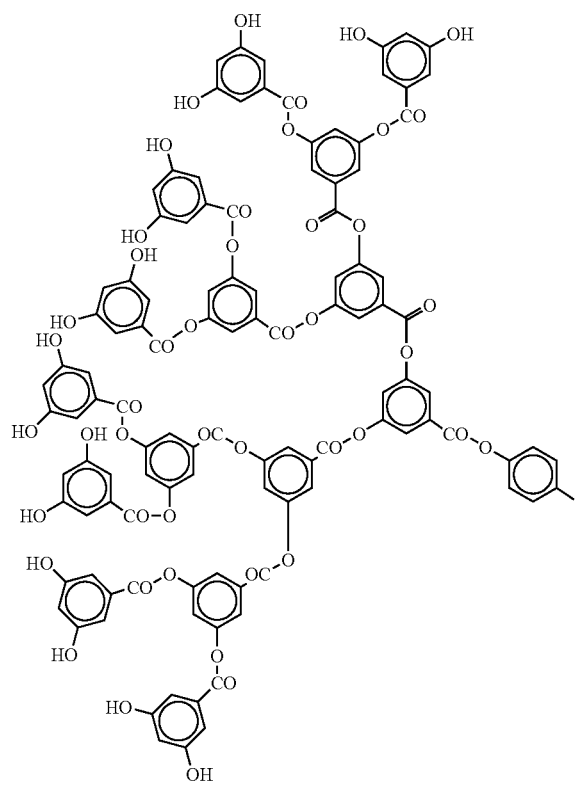
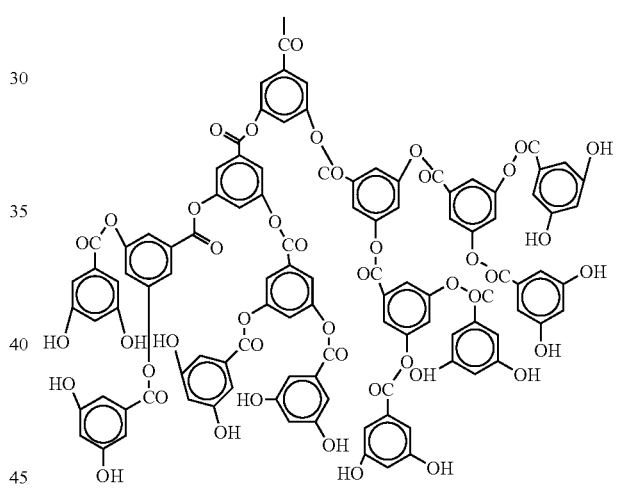
Formula 25
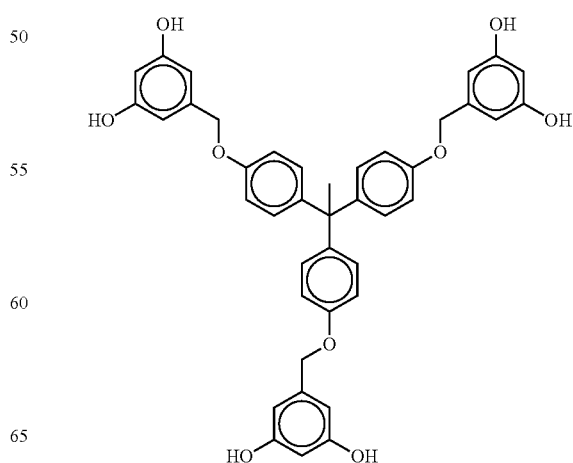

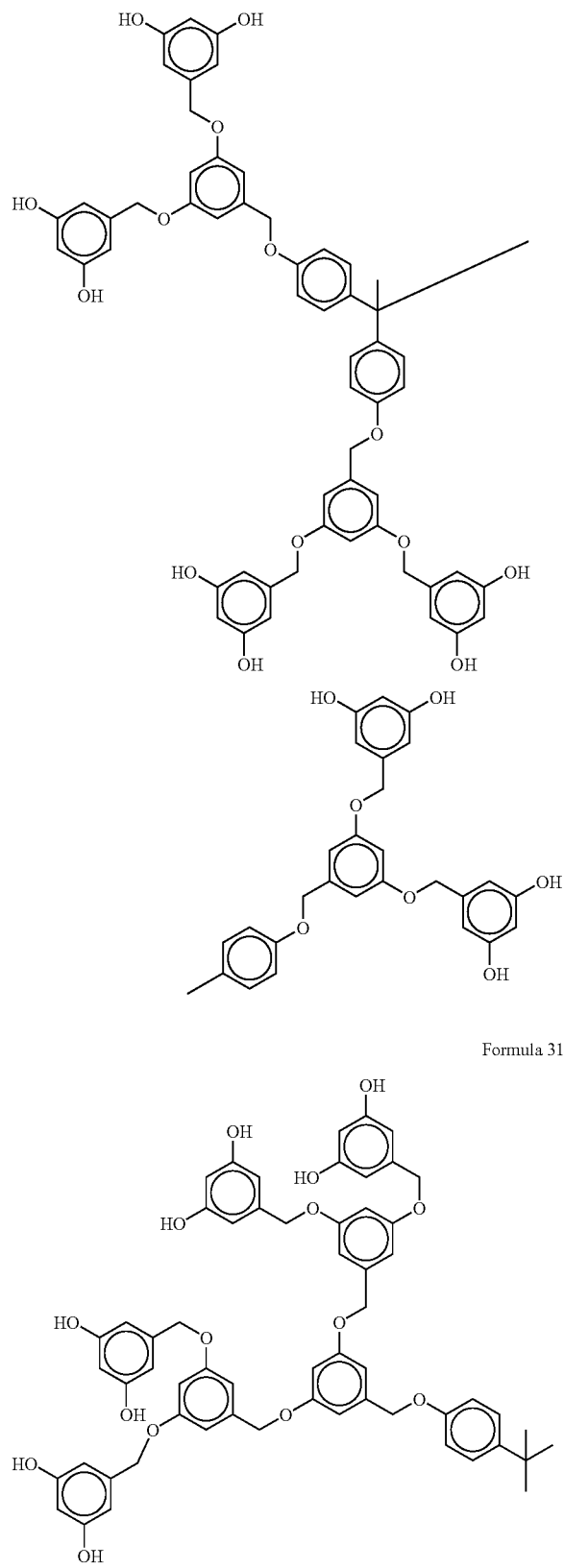

2. The non-linear optical material as recited in claim 1, wherein some of the ends of the polymer having a dendrimer structure is coupled with non-chromophores.

3. The non-linear optical material as recited in claim 2, wherein the non-chromophores are aliphatic hydrocarbons or aromatic hydrocarbons which have 1 to 16 carbon atoms.

4. The non-linear optical material as recited in claim 3, wherein the aromatic hydrocarbons have chemical functional groups connected thereto, the chemical functional groups inducing thermal and optical chemical reactions.

5. The non-linear optical material as recited in claim 1, wherein the chromophore couples to said polymer at the pendant OH group forming an ester or ether linkage; and wherein the organic chromophores are any one selected from the group consisting of the following organic chromophores AIDC, DR1, DANS, DANI, DASS, RDAS, DAIDC, DDANS, DDANI, DDR1, DDASS, DRDAS illustrated as shown:
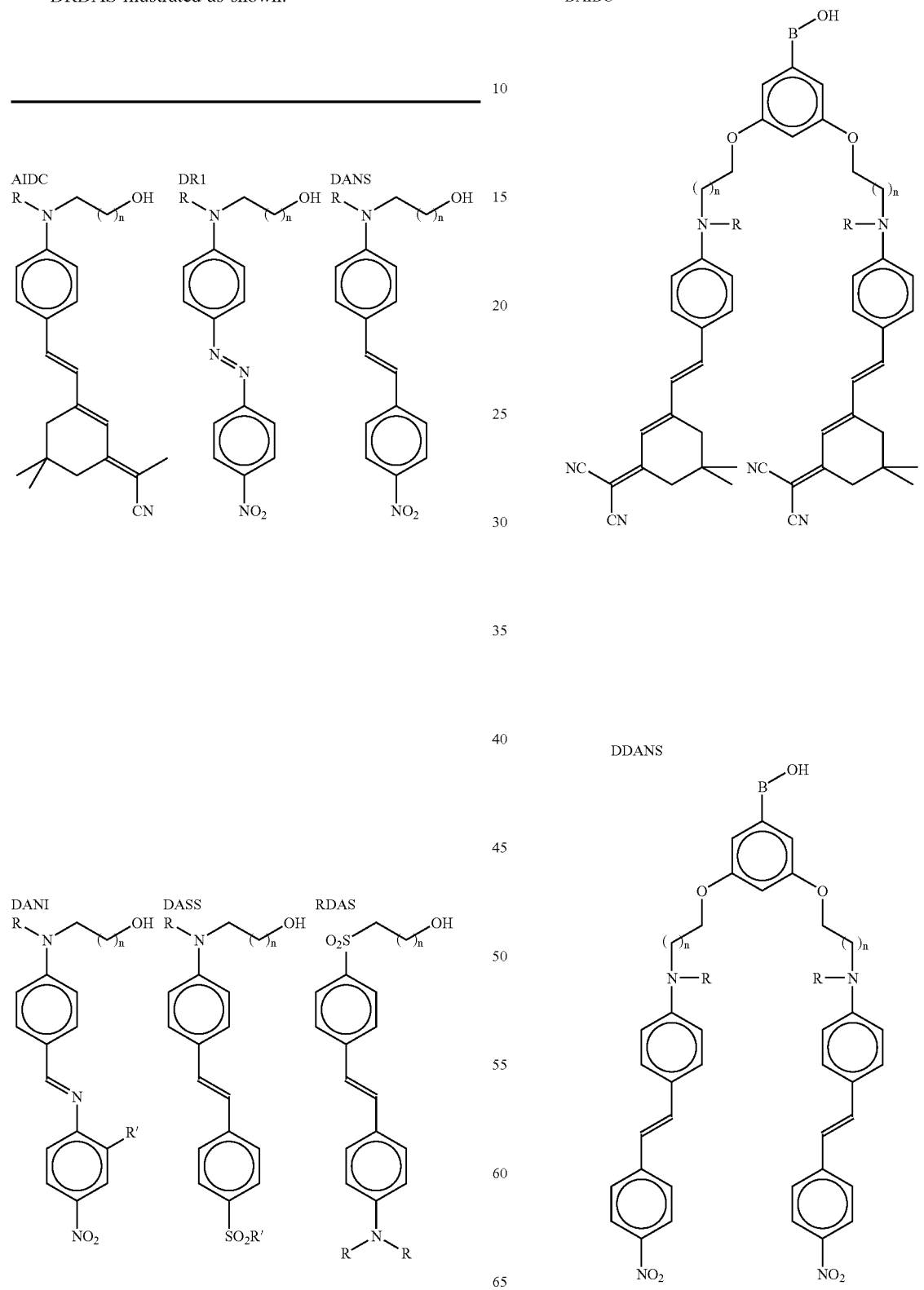

-continued
DDANI
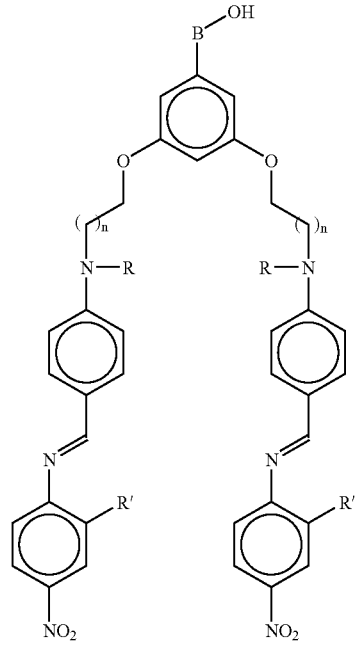
DDR1
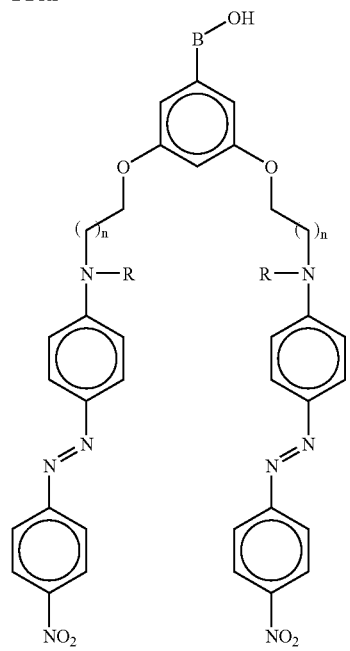
-continued
DDASS
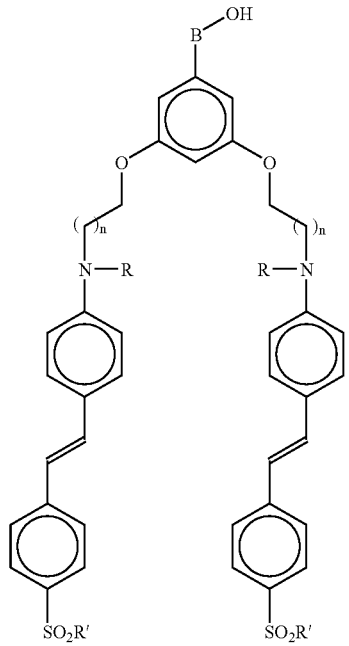
DRDAS
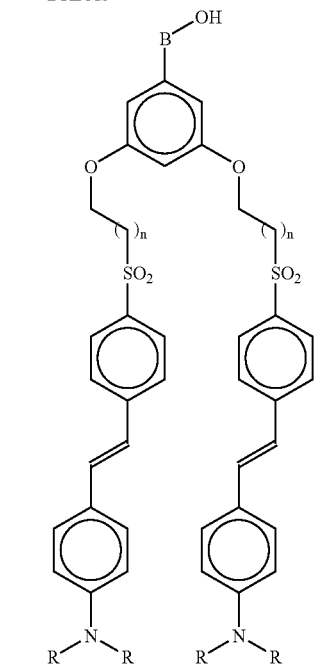
wherein the R and R' are H, a phenyl group or an alkyl group having 1 to 6 carbon atoms;
n is an integer in a range of 1 to 11;
B is an alkyl group having 1 to 6 carbon atoms or a COOA where A is an alkyl group having 1 to 6 carbon atoms.
* * * * *